United States Patent
Galindo et al.

(10) Patent No.: US 10,113,098 B2
(45) Date of Patent: *Oct. 30, 2018

(54) COMPOSITION INCLUDING VISCOSIFIER POLYMER AND POLYAMINE VISCOSITY MODIFIER FOR TREATMENT OF SUBTERRANEAN FORMATIONS

(71) Applicant: Halliburton Energy Services, Inc., Houston, TX (US)

(72) Inventors: Kay Ann Galindo, Montgomery, TX (US); Weibin Zha, The Woodlands, TX (US); Jay Paul Deville, Spring, TX (US); Hui Zhou, The Woodlands, TX (US)

(73) Assignee: Halliburton Energy Servives, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,029

(22) Filed: May 17, 2017

(65) Prior Publication Data
US 2017/0253785 A1 Sep. 7, 2017

Related U.S. Application Data

(63) Continuation of application No. 15/023,612, filed as application No. PCT/US2014/071551 on Dec. 19, 2014, now Pat. No. 9,701,882.

(51) Int. Cl.
*C09K 8/64* (2006.01)
*C09K 8/035* (2006.01)
(Continued)

(52) U.S. Cl.
CPC .............. *C09K 8/035* (2013.01); *C09K 8/508* (2013.01); *C09K 8/512* (2013.01); *C09K 8/588* (2013.01);
(Continued)

(58) Field of Classification Search
CPC .......... C09K 8/035; C09K 8/64; C09K 8/685; C09K 8/82; C09K 8/887; C09K 8/12;
(Continued)

(56) References Cited

U.S. PATENT DOCUMENTS

| 4,277,580 A | 7/1981 | Allen et al. |
| 4,678,591 A | 7/1987 | Giddings et al. |

(Continued)

FOREIGN PATENT DOCUMENTS

| WO | 2015133986 | 9/2015 |
| WO | 2016099553 | 6/2016 |

OTHER PUBLICATIONS

Notice of Allowance for U.S. Appl. No. 15/023,612 dated Feb. 16, 2017.
(Continued)

*Primary Examiner* — Alicia Bland
(74) *Attorney, Agent, or Firm* — Tenley Krueger; Tumey L.L.P.

(57) ABSTRACT

Various embodiments disclosed relate to compositions including a viscosifier polymer and a polyamine viscosity modifier and methods of using the same for treatment of subterranean formations. In various embodiments, the present invention provides a method of treating a subterranean formation. The method includes placing in a subterranean formation a composition including a viscosifier polymer and a polyamine viscosity modifier.

6 Claims, 3 Drawing Sheets

(51) Int. Cl.
*C09K 8/68* (2006.01)
*C09K 8/82* (2006.01)
*C09K 8/88* (2006.01)
*E21B 43/267* (2006.01)
*E21B 33/13* (2006.01)
*E21B 21/06* (2006.01)
*E21B 21/00* (2006.01)
*E21B 43/26* (2006.01)
*C09K 8/508* (2006.01)
*C09K 8/512* (2006.01)
*C09K 8/588* (2006.01)

(52) U.S. Cl.
CPC ............... *C09K 8/64* (2013.01); *C09K 8/685* (2013.01); *C09K 8/82* (2013.01); *C09K 8/887* (2013.01); *E21B 21/00* (2013.01); *E21B 21/003* (2013.01); *E21B 21/062* (2013.01); *E21B 33/13* (2013.01); *E21B 43/26* (2013.01); *E21B 43/267* (2013.01)

(58) Field of Classification Search
CPC ........ C09K 8/508; C09K 8/512; C09K 8/588; E21B 21/00; E21B 21/003; E21B 21/062; E21B 33/13; E21B 43/26; E21B 43/267
See application file for complete search history.

(56) References Cited

U.S. PATENT DOCUMENTS

| | | | |
|---|---|---|---|
| 5,080,809 A | 1/1992 | Stahl et al. | |
| 5,186,257 A * | 2/1993 | Stahl | C08F 226/06 166/270.1 |
| 5,510,436 A | 4/1996 | Hille et al. | |
| 5,607,902 A | 3/1997 | Smith et al. | |
| 5,620,947 A | 4/1997 | Elward-Berry | |
| 5,789,349 A | 8/1998 | Patel | |
| 6,124,245 A | 9/2000 | Patel | |
| 6,355,752 B1 | 3/2002 | Brungs et al. | |
| 6,380,137 B1 | 4/2002 | Heier et al. | |
| 6,465,397 B1 | 10/2002 | Patterson | |
| 6,590,050 B1 | 7/2003 | Bair et al. | |
| 6,696,517 B2 * | 2/2004 | Loffler | C08F 220/58 524/543 |
| 7,098,171 B2 | 8/2006 | Thaemlitz | |
| 8,148,304 B2 | 4/2012 | Spindler et al. | |
| 9,410,069 B2 | 8/2016 | Zha et al. | |
| 9,701,882 B2 * | 7/2017 | Galindo | C09K 8/035 |
| 2005/0230113 A1 | 10/2005 | Eoff et al. | |
| 2007/0179064 A1 | 8/2007 | Jarrett et al. | |
| 2007/0277981 A1 | 12/2007 | Robb et al. | |
| 2008/0135247 A1 | 6/2008 | Hutchins et al. | |
| 2009/0065207 A1 | 3/2009 | Shenoy et al. | |
| 2009/0260819 A1 | 10/2009 | Kurian et al. | |
| 2010/0278763 A1 | 11/2010 | Loeffler et al. | |
| 2011/0163893 A1 | 7/2011 | Ezell et al. | |
| 2011/0180256 A1 | 7/2011 | Tehrani et al. | |
| 2012/0077718 A1 | 3/2012 | Yang et al. | |
| 2012/0138299 A1 | 6/2012 | Joseph et al. | |
| 2012/0244093 A1 | 9/2012 | Daniels | |
| 2013/0261275 A1 | 10/2013 | Musa et al. | |
| 2013/0333892 A1 | 12/2013 | McClung | |
| 2013/0341022 A1 * | 12/2013 | Nguyen | C09K 8/032 166/279 |
| 2014/0352969 A1 | 12/2014 | Chung et al. | |
| 2014/0367108 A1 | 12/2014 | Chung et al. | |
| 2015/0141302 A1 | 5/2015 | Nasr-El-Din et al. | |

OTHER PUBLICATIONS

Notice of allowance for U.S. Appl. No. 14/415,298 dated Apr. 15, 2016.

Canadian Office Action for Application No. 2937762 dated Aug. 11, 2016.

Non-final Rejection for U.S. Appl. No. 15/023,612 dated Nov. 8, 2016.

International Search Report and Written Opinion for Application No. PCT/us2014/019885 dated Dec. 2, 2014.

International Search Report and Written Opinion for Application No. PCT/US2014/071551 dated Sep. 18, 2015.

* cited by examiner

COMPOSITION INCLUDING VISCOSIFIER POLYMER AND POLYAMINE VISCOSITY MODIFIER FOR TREATMENT OF SUBTERRANEAN FORMATIONS

BACKGROUND

Various petroleum extraction subterranean formation treatment procedures require use of compositions having high viscosities, such as during drilling or stimulation treatments. Higher viscosity fluids can more effectively carry materials such as proppants or drill cuttings. Further, higher viscosity drilling fluids can more effectively carry materials away from a drilling location downhole. However, the higher temperatures experienced in subterranean formations can limit, reduce, or degrade the effectiveness of certain viscosifiers, resulting in the use of larger amounts of viscosifiers to compensate for the high temperatures, or the use of expensive temperature-resistant viscosifiers. In addition, the presence of various ions in water can limit, reduce, or degrade the effectiveness of certain viscosifiers.

Various viscosifiers are used with clay in order to achieve a desired viscosity or degree of fluid loss control. However, the use of clay can cause severe formation damage due to plugging of the pores of the reservoir formation and due to difficulty of clean-up.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
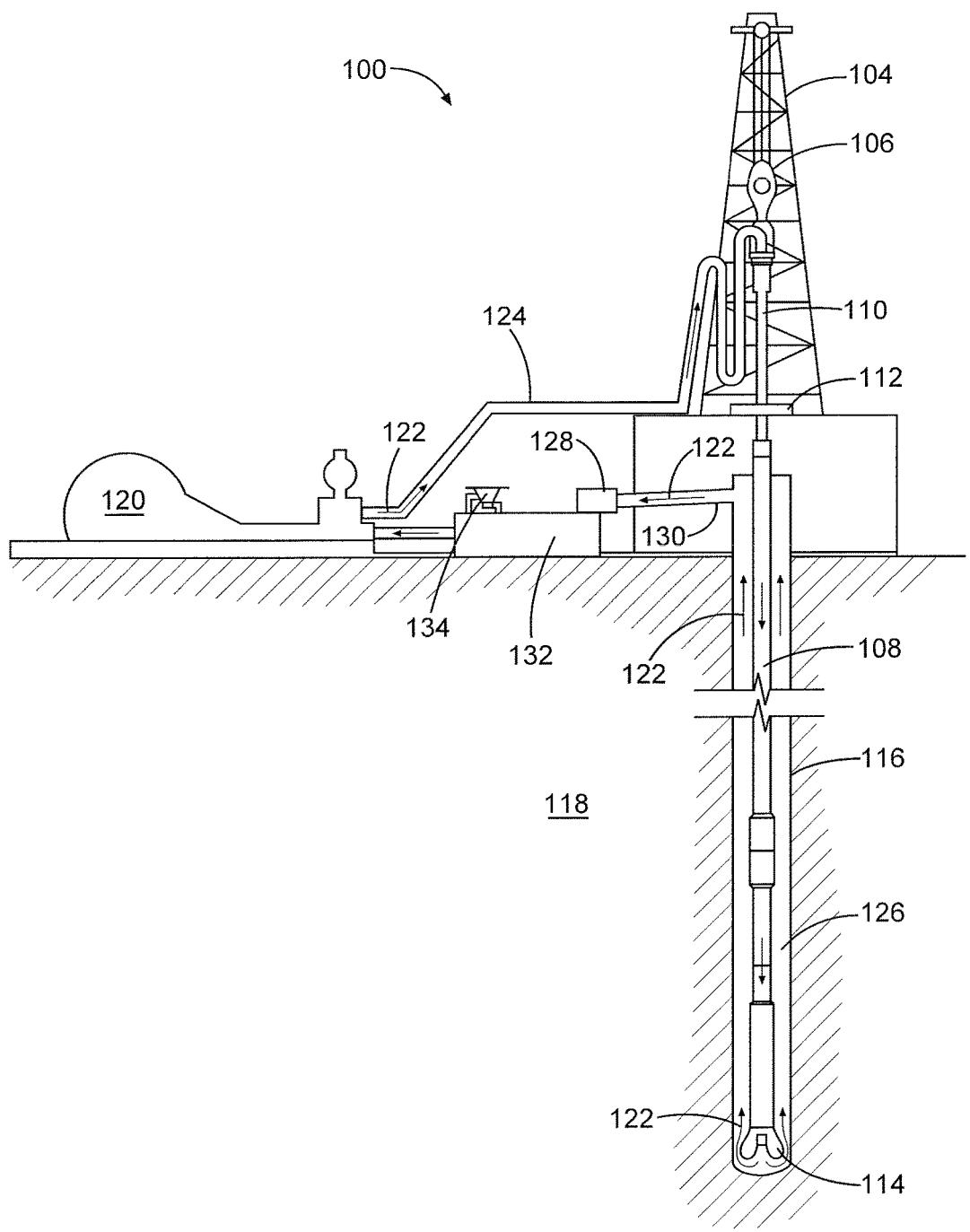
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, within 1%, or within 0% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can itself be substituted or unsubstituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Non-limiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Various embodiments of the present invention provide a method of treating a subterranean formation. The method includes placing in a subterranean formation a composition including a viscosifier polymer. The viscosifier polymer includes an ethylene repeating unit including an —NR$^a$—C(O)—R$^b$ group, wherein at each occurrence R$^a$ and R$^b$ are each independently selected from —H and substituted or unsubstituted ($C_1$-$C_{20}$)hydrocarbyl or R$^a$ and R$^b$ together form a substituted or unsubstituted ($C_2$-$C_{20}$)hydrocarbylene. The viscosifier polymer includes an ethylene repeating unit including an —S(O)$_2$OR$^1$ group wherein at each occurrence R$^1$ is independently selected from —H, substituted or unsubstituted ($C_1$-$C_{20}$)hydrocarbyl, and a counterion. The viscosifier polymer includes at least one crosslinker repeating unit comprising an ethylene repeating unit which at each occurrence is independently linked to an ethylene repeating unit in the same viscosifier polymer molecule or in another molecule of the viscosifier polymer via a substituted or unsubstituted ($C_1$-$C_{40}$)hydrocarbylene that is interrupted by 0, 1, 2, or 3 groups independently chosen from —O—, —S—, and substituted or unsubstituted —NH—. The repeating units are in block, alternate, or random configuration. The composition also includes a polyamine viscosity modifier.

In various embodiments, the present invention provides a method of treating a subterranean formation. The method includes placing in a subterranean formation a composition including a viscosifier polymer including repeating units having the structure:

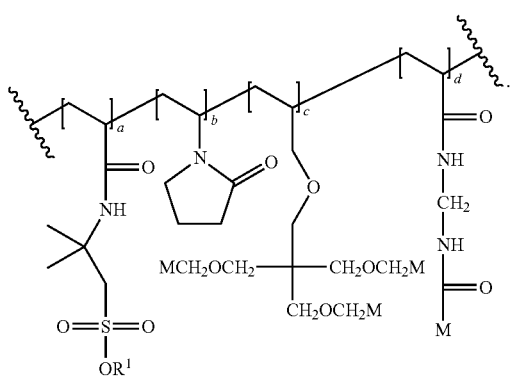

The repeating units are in a block, alternate, or random configuration, and each repeating unit is independently in the orientation shown or in the opposite orientation. At each occurrence $R^1$ is independently selected from —H, substituted or unsubstituted $(C_1$-$C_{20})$hydrocarbyl, and a counterion. At each occurrence M is independently an ethylene repeating unit of the same viscosifier polymer molecule or an ethylene repeating unit of another molecule of the viscosifier polymer. The viscosifier polymer has about 50 mol % to about 98 mol % of the repeating unit including the —S(O)$_2$OR$^1$, about 1 mol % to about 40 mol % of the repeating unit including the 2-pyrrolidon-1-yl group, about 0.1 mol % to about 15 mol % of the repeating unit including the bisacrylamide linker, and about 0.1 mol % to about 15 mol % of the repeating unit including the —CH$_2$—O—CH$_2$—C(—CH$_2$—OCH$_2$M)$_3$ group. The composition also includes at least one of poly(diallyldimethylammonium chloride) and polyacrylamide.

In various embodiments, the present invention provides a system. The system includes a composition that includes a viscosifier polymer. The viscosifier polymer includes an ethylene repeating unit including an —NR$^a$—C(O)—R$^b$ group, wherein at each occurrence R$^a$ and R$^b$ are each independently selected from —H and substituted or unsubstituted $(C_1$-$C_{20})$hydrocarbyl or R$^a$ and R$^b$ together form a substituted or unsubstituted $(C_2$-$C_{20})$hydrocarbylene. The viscosifier polymer includes an ethylene repeating unit including an —S(O)$_2$OR$^1$ group wherein at each occurrence R$^1$ is independently selected from —H, substituted or unsubstituted $(C_1$-$C_{20})$hydrocarbyl, and a counterion. The viscosifier polymer includes at least one crosslinker repeating unit comprising an ethylene repeating unit which at each occurrence is independently linked to an ethylene repeating unit in the same viscosifier polymer molecule or in another molecule of the viscosifier polymer via a substituted or unsubstituted $(C_1$-$C_{40})$hydrocarbylene that is interrupted by 0, 1, 2, or 3 groups independently chosen from —O—, —S—, and substituted or unsubstituted —NH—. The repeating units are in block, alternate, or random configuration. The composition also includes a polyamine viscosity modifier. The system also includes a subterranean formation including the composition therein.

In various embodiments, the present invention provides a composition for treatment of a subterranean formation. The composition includes a viscosifier polymer. The viscosifier polymer includes an ethylene repeating unit including an —NR$^a$—C(O)—R$^b$ group, wherein at each occurrence R$^a$ and R$^b$ are each independently selected from —H and substituted or unsubstituted $(C_1$-$C_{20})$hydrocarbyl or R$^a$ and R$^b$ together form a substituted or unsubstituted $(C_2$-$C_{20})$ hydrocarbylene. The viscosifier polymer includes an ethylene repeating unit including an —S(O)$_2$OR$^1$ group, wherein at each occurrence R$^1$ is independently selected from —H, substituted or unsubstituted $(C_1$-$C_{20})$hydrocarbyl, and a counterion. The viscosifier polymer includes at least one crosslinker repeating unit comprising an ethylene repeating unit which at each occurrence is independently linked to an ethylene repeating unit in the same viscosifier polymer molecule or in another molecule of the viscosifier polymer via a substituted or unsubstituted $(C_1$-$C_{40})$hydrocarbylene that is interrupted by 0, 1, 2, or 3 groups independently chosen from —O—, —S—, and substituted or unsubstituted —NH—. The repeating units are in block, alternate, or random configuration. The composition also includes a polyamine viscosity modifier.

In various embodiments, the present invention provides a composition for treatment of a subterranean formation. The composition includes a viscosifier polymer. The viscosifier polymer includes repeating units having the structure:

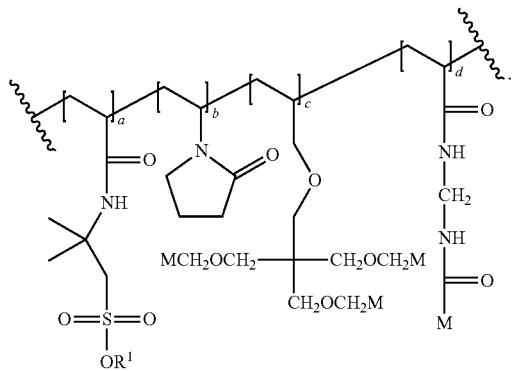

The repeating units are in a block, alternate, or random configuration, and each repeating unit is independently in the orientation shown or in the opposite orientation. At each occurrence $R^1$ is independently selected from —H, substituted or unsubstituted $(C_1$-$C_{20})$hydrocarbyl, and a counterion. At each occurrence M is independently an ethylene repeating unit of the same viscosifier polymer molecule or an ethylene repeating unit of another molecule of the viscosifier polymer. The viscosifier polymer has about 50 mol % to about 98 mol % of the repeating unit including the —S(O)$_2$OR$^1$, about 1 mol % to about 40 mol % of the repeating unit including the 2-pyrrolidon-1-yl group, about 0.1 mol % to about 15 mol % of the repeating unit including the bisacrylamide linker, and about 0.1 mol % to about 15 mol % of the repeating unit including the —CH$_2$—O—CH$_2$—C(—CH$_2$—OCH$_2$M)$_3$ group. The composition also includes at least one of poly(diallyldimethylammonium chloride) and polyacrylamide.

In various embodiments, the present invention provides a method of preparing a composition for treatment of a subterranean formation. The method includes forming a composition including a viscosifier polymer. The viscosifier polymer includes an ethylene repeating unit including an —NR$^a$—C(O)—R$^b$ group, wherein at each occurrence R$^a$ and R$^b$ are each independently selected from —H and substituted or unsubstituted $(C_1$-$C_{20})$hydrocarbyl or R$^a$ and R$^b$ together form a substituted or unsubstituted $(C_2$-$C_{20})$ hydrocarbylene. The viscosifier polymer includes an ethylene repeating unit including an —S(O)$_2$OR$^1$ group, wherein at each occurrence R$^1$ is independently selected from —H, substituted or unsubstituted $(C_1-C_{20})$hydrocarbyl, and a counterion. The viscosifier polymer includes at least one crosslinker repeating unit comprising an ethylene repeating unit which at each occurrence is independently linked to an ethylene repeating unit in the same viscosifier polymer molecule or in another molecule of the viscosifier polymer via a substituted or unsubstituted $(C_1-C_{40})$hydrocarbylene that is interrupted by 0, 1, 2, or 3 groups independently chosen from —O—, —S—, and substituted or unsubstituted —NH—. The repeating units are in block, alternate, or random configuration. The composition also includes a polyamine viscosity modifier.

Various embodiments of the present invention provide certain advantages over other compositions including viscosifiers and methods of using the same, at least some of which are unexpected. For example, in some embodiments, the viscosifier polymer can provide sufficient viscosity or fluid loss control without the use of clay or with the use of less clay, avoiding or reducing the clogging of reservoir pores with clay, and avoiding or reducing the difficulty of cleaning after the use of clay. In various embodiments, the combination of the viscosifier polymer and the polyamine viscosity modifier can provide a better composition for subterranean treatment than a corresponding composition that is free of the polyamine viscosity modifier, such as having a lower viscosity but maintaining low fluid loss under high temperature and high pressure conditions, such as a composition more suitable for use as a drilling mud.

Many conventional viscosifiers suffer a decrease in the viscosity provided and increase of fluid loss when used under high temperature conditions such as the conditions found in many subterranean formations. In some embodiments, under high temperature conditions, the composition can have a higher viscosity or can experience less or no decrease in viscosity as compared to the viscosity provided by other compositions under corresponding conditions. In various embodiments, the higher temperature stability of the viscosifier polymer can allow a desired level of viscosification with the use of less viscosifier, or can allow a higher viscosity to be achieved in the subterranean formation, as compared to other conventional viscosifiers, thereby providing a more versatile, more cost effective, or more efficient viscosification in the subterranean formation than other methods and compositions. In various embodiments, the composition can be less expensive per unit mass as compared to other viscous compositions for subterranean treatment, such as other high-temperature-stable viscous compositions.

Many conventional viscous compositions for subterranean use suffer a decrease in the viscosity provided when prepared with liquids such as water having certain ions present at particular concentrations. For example, many viscosifiers suffer a decrease in the viscosity provided and increase of fluid loss when used with liquids having certain amounts of salts dissolved therein, such as sodium chloride or potassium chloride. Some viscosifiers can even precipitate out of solution in the presence of divalent salts such as calcium chloride, especially when used under high temperature conditions. In some embodiments, the composition can include liquids having ions dissolved therein and can suffer less or no negative effects from the ions, as compared to other viscous compositions for subterranean use, such as less or no decrease in viscosity. By being able to retain the viscosity provided or suffer less reduction in viscosity in the presence of various ions or in the presence of larger amounts of particular ions than other methods and compositions, various embodiments can avoid the need for ion-free or ion-depleted water, or can avoid a need to add greater amounts of viscosifier to achieve a desired effect in a subterranean formation, and can thereby be more versatile, more cost effective, or more efficient than other methods and compositions for subterranean use.

In various embodiments, by providing a higher viscosity under high temperature conditions or high salinity conditions, the composition can be a more effective downhole or subterranean fluid, such as a more effective drilling fluid that has greater cutting carrying capacity, sag resistance, fluid loss control, or equivalent circulating density, or a more effective hydraulic fracturing fluid that can more effectively carry proppant or form more dominant fractures. In various embodiments, the higher viscosity under high temperature conditions can make the composition a more thermally efficient packer fluid. In various embodiments, by providing a higher viscosity under high temperature conditions or high salinity conditions, the composition can be a more effective sweeping agent (e.g., for removing cuttings from the wellbore), can provide improved equivalent circulating density management, and can provide improved fluid loss control (e.g., the higher viscosity can reduce fluid flow in pore spaces). In various embodiments, the composition can be more effective for enhanced oil recovery than other viscosifiers, providing better high temperature stability and salt tolerance, reducing or minimizing fingering and increasing sweep efficiency, enabling more oil recovery at a lower cost.

Methylenebisacrylamide can be hydrolyzed with aging, causing loss of viscosity and fluid loss control. In various embodiments, by including the hydrolytically stable crosslinker pentaerythritol allyl ether, hydrolytic cleavage of the methylenebisacrylamide crosslinker does not affect the viscosity or fluid loss control characteristics of the composition, or has less of an effect on these characteristics, as compared to other compositions including methylenebisacrylamide-crosslinked polymers.

Method of Treating a Subterranean Formation.

In various embodiments, the present invention provides a method of treating a subterranean formation. The method can include placing in a subterranean formation a viscosifier polymer and a polyamine viscosity modifier. The viscosifier polymer can act as a viscosifier and a filtration control agent (providing fluid loss control). In various embodiments, the combination of the viscosifier polymer and the polyamine viscosity modifier can provide effective viscosification but also provide suitable fluid loss control, including at high temperature and high pressure conditions, including at temperatures of up to 400° F., or up to and including 350° F., 355, 360, 365, 370, 375, 380, 385, 390, 395, 400, 405, 410, 415, 420, 425, 430, 435, 440, 445, or 450° F. or more. In various embodiments, the viscosifier polymer and the polyamine viscosity modifier can form a polyelectrolyte complex.

The obtaining or providing of the composition can occur at any suitable time and at any suitable location. The obtaining or providing of the composition can occur above the surface. The obtaining or providing of the composition can occur in the subterranean formation. In some embodiments, the method can include mixing the viscosifier polymer and the polyamine viscosity modifier together. In some embodiments, the viscosifier polymer and polyamine viscosity modifier are already combined when the method begins. The method also includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some embodiments, the method is a method of drilling the subterranean formation, and the composition is a drilling fluid. In some embodiments, the composition can have high compatibility and stability with drill solids. In some embodiments, the method is a method of fracturing the subterranean formation. For example, the composition can be used as or with a drilling fluid, hydraulic fracturing fluid, diverting fluid, or a lost circulation treatment fluid.

In some examples, the placing of the composition in the subterranean formation (e.g., downhole) includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

The method can include diverting or fluid loss control. The composition can be delivered to the subterranean formation to a flowpath causing fluid loss or undesired introduction of water. The composition can have sufficient viscosity or fluid loss control such that the flowpath is at least partially sealed, at least partially stopping fluid loss or preventing water from entering the wellbore and contaminating fluids such as production fluids.

In some embodiments, in addition to the viscosifier polymer and polyamine viscosity modifier, the composition can include at least one of an aqueous liquid and a water-miscible liquid. The method can further include mixing the aqueous liquid or water-miscible liquid with the polymer viscosifier and the polyamine viscosity modifier. The mixing can occur at any suitable time and at any suitable location, such as above surface or in the subterranean formation. The aqueous liquid can be any suitable aqueous liquid, such as at least one of water, brine, produced water, flowback water, brackish water, and sea water. In some embodiments, the aqueous liquid can include at least one of a drilling fluid, a hydraulic fracturing fluid, a diverting fluid, and a lost circulation treatment fluid. The water-miscible liquid can be any suitable water-miscible liquid, such as methanol, ethanol, ethylene glycol, propylene glycol, glycerol, and the like.

The composition can include any suitable proportion of the aqueous liquid or the water-miscible liquid, such that the composition can be used as described herein. For example, about 0.000,1 wt % to 99.999,9 wt % of the composition can be the aqueous liquid, water-miscible liquid, or combination thereof, or about 0.01 wt % to about 99.99 wt %, about 0.1 wt % to about 99.9 wt %, or about 20 wt % to about 90 wt %, or about 0.000,1 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999 wt %, or about 99.999,9 wt % or more of the composition can be the aqueous liquid, water-miscible liquid, or combination thereof.

The aqueous liquid can be a salt water. The salt can be any suitable salt, such as at least one of NaBr, $CaCl_2$, $CaBr_2$, $ZnBr_2$, KCl, NaCl, a magnesium salt, a bromide salt, a formate salt, an acetate salt, and a nitrate salt. The viscosifier polymer and polyamine viscosity modifier can effectively provide increased viscosity in aqueous solutions having various total dissolved solids levels, or having various ppm salt concentration. The viscosifier polymer and polyamine viscosity modifier can provide effective increased viscosity of a salt water having any suitable total dissolved solids level, such as about 1,000 mg/L to about 250,000 mg/L, or about 1,000 mg/L or less, or about 5,000 mg/L, 10,000, 15,000, 20,000, 25,000, 30,000, 40,000, 50,000, 75,000, 100,000, 125,000, 150,000, 175,000, 200,000, 225,000, or about 250,000 mg/L or more. The viscosifier polymer and polyamine viscosity modifier can provide effective increased viscosity of a salt water having any suitable salt concentration, such as about 1,000 ppm to about 300,000 ppm, or about 1,000 ppm to about 150,000 ppm, or about 1,000 ppm or less, or about 5,000 ppm, 10,000, 15,000, 20,000, 25,000, 30,000, 40,000, 50,000, 75,000, 100,000, 125,000, 150,000, 175,000, 200,000, 225,000, 250,000, 275,000, or about 300,000 ppm or more. In some examples, the aqueous liquid can have a concentration of at least one of NaBr, $CaCl_2$, $CaBr_2$, $ZnBr_2$, KCl, and NaCl of about 0.1% w/v to about 20% w/v, or about 0.1% w/v or less, or about 0.5% w/v, 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30% w/v or more.

The composition can have any suitable shear stress at a particular shear rate. For example, at 49° C. at standard pressure at a shear rate of 3 rpm to 6 rpm the composition can have a shear stress of about 3 lb/100 ft$^2$ to about 25 lb/100 ft$^2$, or about 5 lb/100 ft$^2$ to about 15 lb/100 ft$^2$, or about 3 lb/100 ft$^2$ or less, or about 4, 5, 6, 7, 8, 9, 10, 11, 12, 13, 14, 15, 16, 17, 18, 19, 20, 21, 22, 23, 24, or about 25 lb/100 ft$^2$ or more. At 49° C. at standard pressure at a shear rate of 200 rpm to 600 rpm the composition can have a shear stress of about 20 lb/100 ft$^2$ to about 350 lb/100 ft$^2$, or about 20 lb/100 ft$^2$ to about 170 lb/100 ft$^2$, or about 40 lb/100 ft$^2$ to about 130 lb/100 ft$^2$, or about 20 lb/100 ft$^2$ or less, or about 25 lb/100 ft$^2$, 30, 35, 40, 45, 50, 55, 60, 65, 70, 75, 80, 85, 90, 95, 100, 105, 110, 115, 120, 125, 130, 140, 150, 160, 170, 180, 190, 200, 225, 250, 275, 300, 325, or about 350 lb/100 ft$^2$ or more. The composition can have any suitable plastic viscosity, wherein the plastic viscosity represents the viscosity when extrapolated to infinite shear rate, e.g., the slope of the shear stress/shear rate line above the yield point. At 49° C. at standard pressure the composition can have a plastic viscosity of about 20 cP to about 60 cP, about 25 cP to about 45 cP, or about 20 cP or less, or about 22, 24, 26, 28, 30, 32, 34, 36, 38, 40, 42, 44, 46, 48, 50, 52, 54, 56, 58, or about 60 cP or more. The composition can have any suitable yield point, wherein the yield point is the yield stress extrapolated to a shear rate of zero. At 49° C. at standard pressure the composition can have a yield point of about 10 lb/100 ft² to about 100 lb/100 ft², about 14 lb/100 ft² to about 80 lb/100 ft², about 20 lb/100 ft² to about 40 lb/100 ft², or about 10 lb/100 ft² or less, or about 12 lb/100 ft² or less, 14 lb/100 ft², 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 85, 90, 95, or about 100 lb/100 ft² or more. The composition can have any suitable fluid loss control properties, for example, at 350° F. using a 10 micron filter with 500 psi differential for 30 minutes and multiplying the volume of fluid that passes through the filter by two, the composition can have a fluid loss of less than about 30 mL, or about 10 mL to about 20 mL, or 1 mL or less, or about 2, 3, 4, 5, 6, 7, 8, 9, 10, 11, 12, 13, 14, 15, 16, 17, 18, 19, 20, 21, 22, 23, 24, 25, 26, 27, 28, 29, or about 30 mL or more.

In various embodiments, the composition can further include a wetting agent. The wetting agent can be any suitable wetting agent. The wetting agent can form any suitable proportion of the composition, such as about 0.01 wt % to about 30 wt %, or about 0.1 wt % to about 10 wt %, or about 0.01 wt % or less, or about 0.1 wt %, 0.5, 1, 2, 3, 4, 5, 6, 8, 10, 12, 14, 16, 18, 20, 25, or about 30 wt % or more. In various embodiments, the composition can further include a shale inhibitor. The shale inhibitor can form any suitable proportion of the composition, such as about 0.01 wt % to about 30 wt %, or about 0.1 wt % to about 10 wt %, or about 0.01 wt % or less, or about 0.1 wt %, 0.5, 1, 2, 3, 4, 5, 6, 8, 10, 12, 14, 16, 18, 20, 25, or about 30 wt % or more. The inclusion of at least one of a shale inhibitor and a wetting agent in the composition can increase compatibility and stability of the composition with drilling solids.

Viscosifier Polymer.

The composition includes at least one viscosifier polymer. The viscosifier polymer can include an ethylene repeating unit including an —NR$^a$—C(O)—R$^b$ group, wherein at each occurrence R$^a$ and R$^b$ are each independently selected from —H and substituted or unsubstituted (C$_1$-C$_{20}$)hydrocarbyl or R$^a$ and R$^b$ together form a substituted or unsubstituted (C$_2$-C$_{20}$)hydrocarbylene. The viscosifier polymer can include an ethylene repeating unit including an —S(O)$_2$OR$^1$ group wherein at each occurrence R$^1$ can be independently selected from —H, substituted or unsubstituted (C$_1$-C$_{20}$) hydrocarbyl, and a counterion. The viscosifier polymer can include at least one crosslinker repeating unit comprising an ethylene repeating unit which at each occurrence is independently linked to an ethylene repeating unit in the same viscosifier polymer molecule or in another molecule of the viscosifier polymer via a substituted or unsubstituted (C$_1$-C$_{40}$)hydrocarbylene that is interrupted by 0, 1, 2, or 3 groups independently chosen from —O—, —S—, and substituted or unsubstituted —NH—

Any suitable concentration of the viscosifier polymer can be present in the composition, such that the composition can be used as described herein. In some embodiments, about 0.01 wt % to about 100 wt % of the composition is the one or more viscosifier polymers, or about 0.1 wt % to about 50 wt %, about 30 wt % to about 95 wt %, or about 70 wt % to about 90 wt %, about 0.1 wt % to about 5 wt %, or about 0.001 wt % or less, or about 0.01 wt %, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 4, 5, 10, 15, 20, 25, 30, 35, 40, 45, 50, 55, 60, 65, 70, 75, 80, 85, 86, 87, 88, 89, 90, 91, 92, 93, 94, 95, 96, 97, 98, 99, 99.9, 99.99, or about 99.999 wt % or more of the composition is the one or more viscosifier polymers.

The viscosifier polymer can be sufficient to provide effective increased viscosity to an aqueous liquid (e.g., to the composition) at various high temperatures. For example, the viscosifier polymer can provide effective increased viscosity at up to about 500° F., or up to about 490° F., 480, 470, 460, 450, 440, 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, or up to about 100° F.

The viscosifier polymer can have any suitable molecular weight, such as about 5,000,000 g/mol to about 1,000,000,000 g/mol, about 7,000,000 g/mol to about 100,000,000 g/mol, or about 5,000,000 g/mol or less, or about 5,500,000 g/mol, 6,000,000, 6,500,000, 7,000,000, 7,500,000, 8,000,000, 8,500,000, 9,000,000, 9,500,000, 10,000,000, 10,500,000, 11,000,000, 11,500,000, 12,000,000, 12,500,000, 13,000,000, 13,500,000, 14,000,000, 14,500,000, 15,000,000, 20,000,000, 50,000,000, 100,000,000, 500,000,000, or about 1,000,000,000 g/mol or more. The viscosifier polymer can have a molecular weight of at least about 5,000,000 g/mol, or at least about 10,000,000, 20,000,000, 50,000,000, or at least about 100,000,000 g/mol.

The viscosifier polymer can have about A$^{mol}$ mol % of the repeating unit including the —S(O)$_2$OR$^1$, wherein A$^{mol}$ is any suitable mol %, such as about 50 mol % to about 98 mol %, about 75 mol % to about 95 mol %, or about 50 mol % or less, or about 52, 54, 56, 58, 60, 62, 64, 66, 68, 70, 72, 74, 75, 76, 77, 78, 79, 80, 81, 82, 83, 84, 85, 86, 87, 88, 89, 90, 91, 92, 93, 94, 95, 96, 97, or 98 mol % or more. The viscosifier polymer can have about B$^{mol}$ mol % of the repeating unit including the —NR$^a$—C(O)—R$^b$ group, wherein B$^{mol}$ is any suitable mol %, such as about 1 mol % to about 40 mol %, about 5 mol % to about 20 mol %, 1 mol % or less, 2, 3, 4, 5, 6, 7, 8, 9, 10, 11, 12, 13, 14, 15, 16, 17, 18, 19, 20, 22, 24, 26, 28, 30, 32, 34, 36, 38, or about 40 mol % or more. The viscosifier polymer can have about E$^{mol}$ mol % of the one or more crosslinker repeating units, E$^{mol}$ is about 0.1 mol % to about 30 mol %, about 1 mol % to about 15 mol %, about 0.1 mol % or less, 0.5 mol %, 1, 2, 3, 4, 5, 6, 7, 8, 9, 10, 11, 12, 13, 14, 15, 16, 18, 20, 22, 24, 26, 28, or about 30 mol % or more. In some embodiments, A$^{mol}$+B$^{mol}$+E$^{mol}$=100 mol %. In some embodiments, C$^{mol}$+D$^{mol}$=E$^{mol}$.

The crosslinker repeating unit can be formed from (e.g., formed from co-polymerization of the other monomers of the polymer with) any suitable polyalkenyl compound, such as a (C$_1$-C$_{20}$)alkylenebiacrylamide (e.g., methylenebisacrylamide), a poly((C$_1$-C$_{20}$)alkenyl)-substituted mono- or poly-(C$_1$-C$_{20}$)alkyl ether (e.g., pentaerythritol allyl ether), or a poly(C$_2$-C$_{20}$)alkenylbenzene (e.g., divinylbenzene). In some embodiments, the crosslinker repeating unit can be formed from at least one of methylenebisacrylamide, ethylenebisacrylamide, a polyethylene glycol dimethacrylate, 1,1,1-trimethylolpropane trimethacrylate, divinyl ether, diallyl ether, a vinyl or allyl ether of a polyglycol or a polyol, a divinylbenzene, divinyltetrahydropyrimidin-2(1H)-one, a diene, an allyl amine, N-vinyl-3(E)-ethylidene pyrrolidone, ethylidene bis(N-vinylpyrrolidone), allyl acrylate, N,N-diallylacrylamide, 2,4,6-triallyloxy-1,3,5-triazine, 1,3,5-triacryloylhexahydro-1,3,5-triazine, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, pentaerythritol allyl ether, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate.

The viscosifier polymer can include one or more different kinds of the crosslinker repeating units. The viscosifier polymer can include a crosslinker repeating unit that is an ethylene repeating unit at each occurrence independently linked to an ethylene repeating unit in the same viscosifier polymer molecule or in another molecule of the viscosifier polymer via a —C(O)—NH-(substituted or unsubstituted $(C_1-C_{20})$hydrocarbylene)-NH—C(O)— group. The viscosifier polymer can include a crosslinker repeating unit that is an ethylene repeating unit bonded to an —$R^2$—O—$R^2$—C(—$R^2$—$OR^3$)$_3$ group, wherein at each occurrence $R^2$ is independently substituted or unsubstituted $(C_1-C_{10})$hydrocarbylene and at each occurrence $R^3$ is independently selected from —H and -(substituted or unsubstituted $(C_1-C_{10})$hydrocarbylene)-M, wherein at each occurrence M is independently an ethylene repeating unit of the same viscosifier polymer molecule or an ethylene repeating unit of another molecule of the viscosifier polymer.

The viscosifier polymer can have about $C^{mol}$ mol % of the repeating unit including the —C(O)—NH-(substituted or unsubstituted $(C_1-C_{20})$hydrocarbylene)-NH—C(O)— group wherein $C^{mol}$ is any suitable mol %, such as about 0.1 mol % to about 15 mol %, about 0.5 mol % to about 8 mol %, about 0.5 mol % to about 6 mol %, or about 0.1 mol % or less, or about 0.5 mol %, 1, 1.5, 2, 2.5, 3, 3.5, 4, 4.5, 5, 5.5, 6, 7, 8, 9, 10, 11, 12, 13, 14, or about 15 mol % or more. The viscosifier polymer can have about $D^{mol}$ mol % of the repeating unit including the —$R^2$—O—$R^2$—C(—$R^2$—$OR^3$)$_3$ group, wherein $D^{mol}$ is any suitable mol %, such as about 0.1 mol % to about 15 mol %, about 0.5 mol % to about 8 mol %, or about 0.1 mol % or less, or about 0.5 mol %, 1, 1.5, 2, 2.5, 3, 3.5, 4, 4.5, 5, 5.5, 6, 7, 8, 9, 10, 11, 12, 13, 14, or about 15 mol % or more. In various embodiments, the viscosifier polymer only includes four types of repeating units, such that $A^{mol}+B^{mol}+C^{mol}+D^{mol}$ is about 100%.

In various embodiments, the viscosifier polymer includes repeating units having the structure:

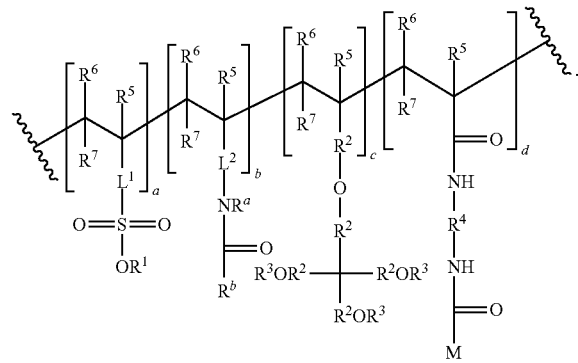

The repeating units are in a block, alternate, or random configuration, and each repeating unit is independently in the orientation shown or in the opposite orientation.

At each occurrence, $R^1$ can be independently selected from —H and a counterion. At each occurrence, $R^1$ can be independently selected from —H, Na$^+$, K$^+$, Li$^+$, NH$_4^+$, Ca$^{2+}$, Zn$^{2+}$, Al$^{3+}$, Mg$^{2+}$, and an organic amine cation such as NR$^E_4{}^+$, wherein at each occurrence R$^E$ is independently chosen from —H and substituted or unsubstituted $(C_1-C_{30})$hydrocarbyl interrupted by 0, 1, 2, or 3 groups independently chosen from —O—, —S—, and substituted or unsubstituted —NH—, or wherein two or three R$^E$ groups together form a substituted or unsubstituted $(C_1-C_{30})$hydrocarbylene or $(C_1-C_{30})$hydrocarbtriyl interrupted by 0, 1, 2, or 3 groups independently chosen from —O—, —S—, and substituted or unsubstituted —NH— (e.g., the nitrogen of NR$^E_4{}^+$ can be in the form of a nitrogen-containing heterocyclic ring as —N$^+$R$^E_{2-}$ or as =N$^+$R$^E_-$). In some embodiments, R$^1$ can be selected from an ammonium ion described in U.S. Patent Publication No. 2010/0278763, hereby incorporated by reference. At each occurrence, $R^1$ can be H. The variable $R^1$ can be substituted or unsubstituted $(C_1-C_{20})$hydrocarbyl, $(C_1-C_{10})$alkyl, $(C_1-C_5)$alkyl, or methyl, ethyl, propyl, butyl, or pentyl.

At each occurrence, $R^5$, $R^6$, and $R^7$ can be independently selected from —H and a substituted or unsubstituted $(C_1-C_5)$hydrocarbyl. At each occurrence, $R^5$, $R^6$, and $R^7$ can be independently selected from —H and a $(C_1-C_5)$alkyl. At each occurrence, $R^5$, $R^6$, and $R^7$ can be independently selected from —H and a $(C_1-C_3)$alkyl. At each occurrence, $R^5$, $R^6$, and $R^7$ can be —H.

At each occurrence, $L^1$ can be independently selected from a bond and a substituted or unsubstituted $(C_1-C_{40})$hydrocarbyl interrupted or terminated with 0, 1, 2, or 3 of at least one of —NR$^3$—, —S—, and —O—. At each occurrence, $L^1$ can be independently selected from a bond and -(substituted or unsubstituted $(C_1-C_{20})$hydrocarbyl)-NR$^3$-(substituted or unsubstituted $(C_1-C_{20})$hydrocarbyl)-. At each occurrence, $L^1$ can be independently —C(O)—NH-(substituted or unsubstituted $(C_1-C_{20})$hydrocarbyl)-. At each occurrence, $L^1$ can be independently —C(O)—NH—((C$_1$-C$_5$)hydrocarbyl)-. The variable $L^1$ can be —C(O)—NH—CH(CH$_3$)$_2$—CH$_2$—.

At each occurrence, $L^2$ can be independently selected from a bond and a substituted or unsubstituted $(C_1-C_{40})$hydrocarbyl interrupted or terminated with 0, 1, 2, or 3 of at least one of —NR$^3$—, —S—, and —O—. At each occurrence, $L^2$ can be independently selected from a bond and substituted or unsubstituted $(C_1-C_{20})$hydrocarbylene. At each occurrence, $L^2$ can be independently selected from a bond and $(C_1-C_{20})$alkylene. At each occurrence, $L^2$ can be independently selected from a bond and $(C_1-C_5)$alkylene. At each occurrence, $L^2$ can be a bond.

At each occurrence R$^a$ and R$^b$ can be each independently selected from —H and substituted or unsubstituted $(C_1-C_{20})$hydrocarbyl or R$^a$ and R$^b$ together can form a substituted or unsubstituted $(C_2-C_{20})$hydrocarbylene. At each occurrence R$^a$ and R$^b$ can be independently selected from —H and $(C_1-C_{20})$alkyl. At each occurrence R$^a$ and R$^b$ can be independently selected from —H and $(C_1-C_{10})$alkyl. At each occurrence R$^a$ and R$^b$ can be independently selected from —H, methyl, ethyl, propyl, butyl, and pentyl. The —NR$^a$—C(O)—R$^b$ group can be a 2-pyrrolidon-1-yl, caprolactam-1-yl, formamid-1-yl, or N-methylacetamide-1-yl group, as derived from an N-vinylamide such as N-vinylcaprolactam, N-vinylformamide, N-vinyl-N-methylacetamide.

At each occurrence, $R^2$ can be independently $(C_1-C_{10})$ hydrocarbylene. At each occurrence, $R^2$ can be $(C_1-C_{10})$ alkylene. At each occurrence, $R^2$ can be $(C_1-C_5)$alkylene. At each occurrence, $R^2$ can be —$CH_2$—.

At each occurrence, $R^3$ can be independently selected from —H and —$((C_1-C_{10})$hydrocarbylene)-M. At each occurrence, M can be independently an ethylene repeating unit of the same viscosifier polymer molecule or an ethylene repeating unit of another molecule of the viscosifier polymer. At each occurrence, $R^3$ can be independently selected from —H and —$((C_1-C_{10})$alkylene)-M. At each occurrence, $R^3$ can be independently selected from —H and —$((C_1-C_5)$alkylene)-M. At each occurrence, $R^3$ can be independently selected from —H and —$CH_2$-M. At least one $R^3$-containing repeating unit can have at least one $R^3$=M. In some embodiments, per molecule, the $R^3$-containing repeating units have an average of about 1, 2, or 3 $R^3$ that are M. In various embodiments, the bond -M can be a direct bond to an ethylene repeating unit of the same or another viscosifier polymer, and in other embodiments, the bond -M can link to another ethylene repeating unit or the same or another viscosifier polymer via a linking group, which can include any suitable linking group, such as one or more groups derived from polymerization of di- or poly-vinyl crosslinking molecules (e.g., multiple crosslinkers can form a chain that bonds one ethylene unit to another, for example, a pentaerythritol allyl ether in one polymer can crosslink to a pentaerythritol allyl ether in another molecule, or to a methylenebisacrylamide in another molecule).

At each occurrence, $R^4$ can be $(C_1-C_{20})$hydrocarbylene. At each occurrence, $R^4$ can be $(C_1-C_{20})$alkylene. At each occurrence, $R^4$ can be $(C_1-C_5)$alkylene. At each occurrence, $R^4$ can be methylene.

The variable a can have any suitable value, such that the viscosifier polymer can be used as described herein, such as about 1,000 to about 500,000, or about 1,000 or less, or about 1,500, 2,000, 3,000, 4,000, 5,000, 7,500, 10,000, 15,000, 20,000, 25,000, 50,000, 75,000, 100,000, 125,000, 150,000, 175,000, 200,000, 225,000, 250,000, 275,000, 300,000, 325,000, 350,000, 375,000, 400,000, 425,000, 450,000, 475,000, or about 500,000 or more. The variable b can have any suitable value, such that the viscosifier polymer can be used as described herein, such as about 100 to about 200,000, or about 100 or less, or about 200, 300, 400, 500, 750, 1,000, 1,250, 1,500, 1,750, 2,000, 2,500, 5,000, 7,500, 10,000, 15,000, 20,000, 25,000, 50,000, 75,000, 100,000, 125,000, 150,000, 175,000, or about 200,000 or more. The variable c can have any suitable value, such that the viscosifier polymer can be used as described herein, such as about 1 to about 50,000, or about 1, 2, 3, 4, 5, 6, 8, 10, 12, 14, 16, 18, 20, 25, 30, 35, 40, 45, 50, 60, 70, 80, 90, 100, 150, 200, 250, 300, 350, 400, 450, 500, 600, 700, 800, 900, 1,000, 1,250, 1,500, 1,750, 2,000, 2,500, 5,000, 7,500, 10,000, 15,000, 20,000, 25,000, or about 50,000 or more. The variable d can have any suitable value, such that the viscosifier polymer can be used as described herein, such as about 1 to about 50,000, or about 1, 2, 3, 4, 5, 6, 8, 10, 12, 14, 16, 18, 20, 25, 30, 35, 40, 45, 50, 60, 70, 80, 90, 100, 150, 200, 250, 300, 350, 400, 450, 500, 600, 700, 800, 900, 1,000, 1,250, 1,500, 1,750, 2,000, 2,500, 5,000, 7,500, 10,000, 15,000, 20,000, 25,000, or about 50,000 or more. The variable e can correspond to the number of the one or more crosslinker repeating units, and can be any suitable value, such that the viscosifier polymer can be used as described herein, such as equal to c+d, or such as about 1 to about 100,000, or about 1, 2, 3, 4, 5, 6, 8, 10, 12, 14, 16, 18, 20, 25, 30, 35, 40, 45, 50, 60, 70, 80, 90, 100, 150, 200, 250, 300, 350, 400, 450, 500, 600, 700, 800, 900, 1,000, 1,250, 1,500, 1,750, 2,000, 2,500, 5,000, 7,500, 10,000, 15,000, 20,000, 25,000, 50,000, 75,000, 20,000, 25,000, 50,000, 75,000, or about 100,000 or more.

In some embodiments, the viscosifier polymer can include repeating units having the structure:

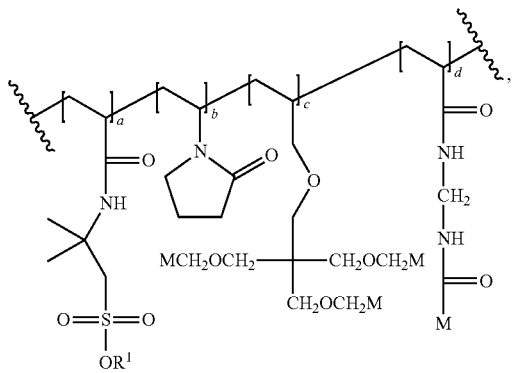

The repeating units are in a block, alternate, or random configuration, and each repeating unit is independently in the orientation shown or in the opposite orientation.

Polyamine Viscosity Modifier.

The composition can include a polyamine viscosity modifier. The composition can include one or more than one polyamine viscosity modifier. The one or more polyamine viscosity modifiers can form any suitable proportion of the composition, such as about 0.01 wt % to about 99.99 wt %, or about 0.01 wt % to about 5 wt %, or about 0.01 wt % or less, or about 0.05 wt %, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 6, 7, 8, 9, 10, 12, 14, 16, 18, 20, 25, 30, 35, 40, 45, 50, 55, 60, 65, 70, 75, 80, 85, 90, 95, 96, 97, 98, 99, 99.9, or 99.99 wt % or more. The polyamine viscosity modifier can be rapidly incorporated and any activation temperature typically needed for the polyamine viscosity modifier when used alone can be eliminated in the composition. Solid or liquid polyamine viscosity modifiers can be used.

In various embodiments, the polyamine viscosity modifier can be a polymer that includes at least one substituted or unsubstituted repeating unit having an ethylenamide structure:

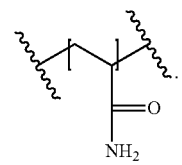

The structure can be substituted or unsubstituted at each of the carbon atoms of the ethylene unit or at the —$NH_2$ moiety. Any suitable proportion of the repeating units in the polymer can have the ethylenamide structure, such as about 50 mol % to about 100 mol %, or about 50 mol % or less, or about 55 mol %, 60, 65, 70, 75, 80, 85, 86, 87, 88, 89, 90, 91, 92, 93, 94, 95, 96, 97, 98, or about 99 mol % or more, or 100 mol %. The polyamine viscosity modifier can be a polyacrylamide, such as a polyacrylamide homopolymer. In some embodiments, the polymer including the ethylenamide repeating units can be substantially non-ionic. The polymer including the ethylenamide repeating units can have any suitable activity (e.g., 10%-80%, 20%-60%, or about 30-40% active), and can have any suitable molecular weight, such as about 1,000,000 to about 20,000,000, or about 4,000,000 to about 15,000,000.

In various embodiments, the polyamine viscosity modifier can be a cationic polyamine viscosity modifier. The cationic polyamine viscosity modifier can be a polymer including at least one repeating unit formed from polymerization of a di($C_2$-$C_{20}$)alkenyldi($C_1$-$C_{20}$)alkyl)ammonium halide. The cationic polyamine viscosity modifier can include a poly(di ($C_2$-$C_{20}$)alkenyldi($C_1$-$C_{20}$)alkyl)ammonium halide). The cationic polyamine viscosity modifier can be a poly(di($C_2$-$C_{20}$)alkenyldi($C_1$-$C_{20}$)alkyl)ammonium halide). The cationic polyamine viscosity modifier can be a poly(diallyldi ($C_1$-$C_5$)alkyl)ammonium halide). The polyamine viscosity modifier can be poly(diallyldimethylammonium chloride) (poly(DADMAC)). The cationic polyamine viscosity modifier can be a liquid or a solid. The cationic polyamine viscosity modifier can have any suitable molecular weight, such as about 500,000 to about 5,000,000, or about 1,000,000 to about 2,000,000.

Other Components.

The composition including the viscosifier polymer and polyamine viscosity modifier, or a mixture including the composition, can include any suitable additional component in any suitable proportion, such that the viscosifier polymer and polyamine viscosity modifier, composition, or mixture including the same, can be used as described herein.

The composition including the viscosifier polymer and polyamine viscosity modifier can further include a polyacrylate ester or salt (with any suitable counterion), such as a sodium polyacrylate or a sodium polymethacrylate. The polyacrylate (e.g., sodium polyacrylate) can form any suitable wt % of the composition, such as about 0.01 wt % to about 10 wt %, 0.1 wt % to about 5 wt %, about 0.2 wt % to about 2 wt %, or about 0.01 wt % or less, or about 0.05 wt %, 0.1, 0.5, 1, 1.5, 2, 3, 4, 5, 6, 7, 8, 9, or about 10 wt % or more.

The composition can further include a secondary viscosifier, in addition to the viscosifier polymer. The secondary viscosifier can affect the viscosity of the composition or a solvent that contacts the composition at any suitable time and location. In some embodiments, the secondary viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the secondary viscosifier can be about 0.000,1 wt % to about 10 wt % of the composition or a mixture including the same, about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition or a mixture including the same.

The secondary viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The secondary viscosifier can include a polymer including at least one repeating unit derived from a monomer selected from ethylene glycol, acrylamide, vinyl acetate, 2-acrylamidomethylpropane sulfonic acid or its salts, trimethylammoniumethyl acrylate halide, and trimethylammoniumethyl methacrylate halide. The secondary viscosifier can include a crosslinked gel or a crosslinkable gel. The secondary viscosifier can include at least one of a linear polysaccharide, and a poly(($C_2$-$C_{10}$) alkene), wherein the ($C_2$-$C_{10}$)alkene is substituted or unsubstituted. The secondary viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly (vinyl pyrrolidone), polyacrylamide, poly (hydroxyethyl methacrylate), alginate, chitosan, curdlan, dextran, derivatized dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, starch, derivatized starch, tamarind, tragacanth, guar gum, derivatized guar gum (e.g., hydroxypropyl guar, carboxy methyl guar, or carboxymethyl hydroxypropyl guar), gum ghatti, gum arabic, locust bean gum, cellulose, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the secondary viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The secondary viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$) hydrocarbyl having at least one aliphatic unsaturated C—C bond therein, and a substituted or unsubstituted ($C_2$-$C_{50}$) alkene. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The secondary viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$) alkenyl nitrogen containing substituted or unsubstituted ($C_1$-$C_{10}$)heterocycle. The secondary viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The secondary viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The secondary viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition or a mixture including the same, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $NH_4^+$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hyporchlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the viscosifier polymer and polyamine viscosity modifier or a mixture including the same can include any suitable downhole fluid. The composition including the viscosifier polymer and polyamine viscosity modifier can be combined with any suitable downhole fluid before, during, or after the placement of the composition in the subterranean formation or the contacting of the composition and the subterranean material. In some examples, the composition including the viscosifier polymer and polyamine viscosity modifier is combined with a downhole fluid above the surface, and then the combined composition is placed in a subterranean formation or contacted with a subterranean material. In another example, the composition including the viscosifier polymer and polyamine viscosity modifier is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition, or a mixture including the same, can include any suitable amount of any suitable material used in a downhole fluid. For example, the composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition or a mixture including the same can include one or more additive components such as: COLD-TROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; AQUATONE-S™ wetting agent; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition or a mixture including the same can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™ EP MUDLUBE®, and DRIL-N-SLIDE™ lubricants; QUIK-THIN®, IRON-THIN™, THERMA-THIN®, and ENVIRO-THIN™ thinners; SOURSCAV™ scavenger; BARACOR® corrosion inhibitor; and WALL-NUT®, SWEEP-WATE®, STOP-PIT™, PLUG-GIT®, BARACARB®, DUO-SQUEEZE®, BAROFIBRE™, STEELSEAL®, and HYDRO-PLUG® lost circulation management materials. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the viscosifier polymer and polyamine viscosity modifier can form a useful combination with cement or cement kiln dust. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

Drilling Assembly.

In various embodiments, the composition including the viscosifier polymer and polyamine viscosity modifier disclosed herein can directly or indirectly affect one or more components or pieces of equipment associated with the preparation, delivery, recapture, recycling, reuse, and/or disposal of the disclosed composition including the viscosifier polymer and polyamine viscosity modifier. For example, and with reference to FIG. 1, the disclosed composition including the viscosifier polymer and polyamine viscosity modifier can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While the fluid processing unit(s) 128 is illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the viscosifier polymer and polyamine viscosity modifier can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the viscosifier polymer and polyamine viscosity modifier can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the viscosifier polymer and polyamine viscosity modifier can be stored, reconditioned, and/or regulated until added to the drilling fluid 122.

As mentioned above, the composition including the viscosifier polymer and polyamine viscosity modifier can directly or indirectly affect the components and equipment of the drilling assembly 100. For example, the composition including the viscosifier polymer and polyamine viscosity modifier can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the viscosifier polymer and polyamine viscosity modifier.

The composition including the viscosifier polymer and polyamine viscosity modifier can directly or indirectly affect the pump 120, which representatively includes any conduits, pipelines, trucks, tubulars, and/or pipes used to fluidically convey the composition including the viscosifier polymer and polyamine viscosity modifier to the subterranean formation, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition including the viscosifier polymer and polyamine viscosity modifier can also directly or indirectly affect the mixing hopper 134 and the retention pit 132 and their assorted variations.

The composition including the viscosifier polymer and polyamine viscosity modifier can also directly or indirectly affect the various downhole or subterranean equipment and tools that can come into contact with the composition including the viscosifier polymer and polyamine viscosity modifier such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the viscosifier polymer and polyamine viscosity modifier can also directly or indirectly affect any downhole heat exchangers, valves and corresponding actuation devices, tool seals, packers and other wellbore isolation devices or components, and the like associated with the wellbore 116. The composition including the viscosifier polymer and polyamine viscosity modifier can also directly or indirectly affect the drill bit 114, which can include roller cone bits, polycrystalline diamond compact (PDC) bits, natural diamond bits, hole openers, reamers, coring bits, and the like.

While not specifically illustrated herein, the composition including the viscosifier polymer and polyamine viscosity modifier can also directly or indirectly affect any transport or delivery equipment used to convey the composition including the viscosifier polymer and polyamine viscosity modifier to the drilling assembly 100 such as, for example, any transport vessels, conduits, pipelines, trucks, tubulars, and/or pipes used to fluidically move the composition including the viscosifier polymer and polyamine viscosity modifier from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including the viscosifier polymer and polyamine viscosity modifier. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), with the tubular containing a composition including the viscosifier polymer and polyamine viscosity modifier described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use or that can be generated by use of the composition including the viscosifier polymer and polyamine viscosity modifier described herein in a subterranean formation, or that can perform or be generated by performance of a method for using the composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
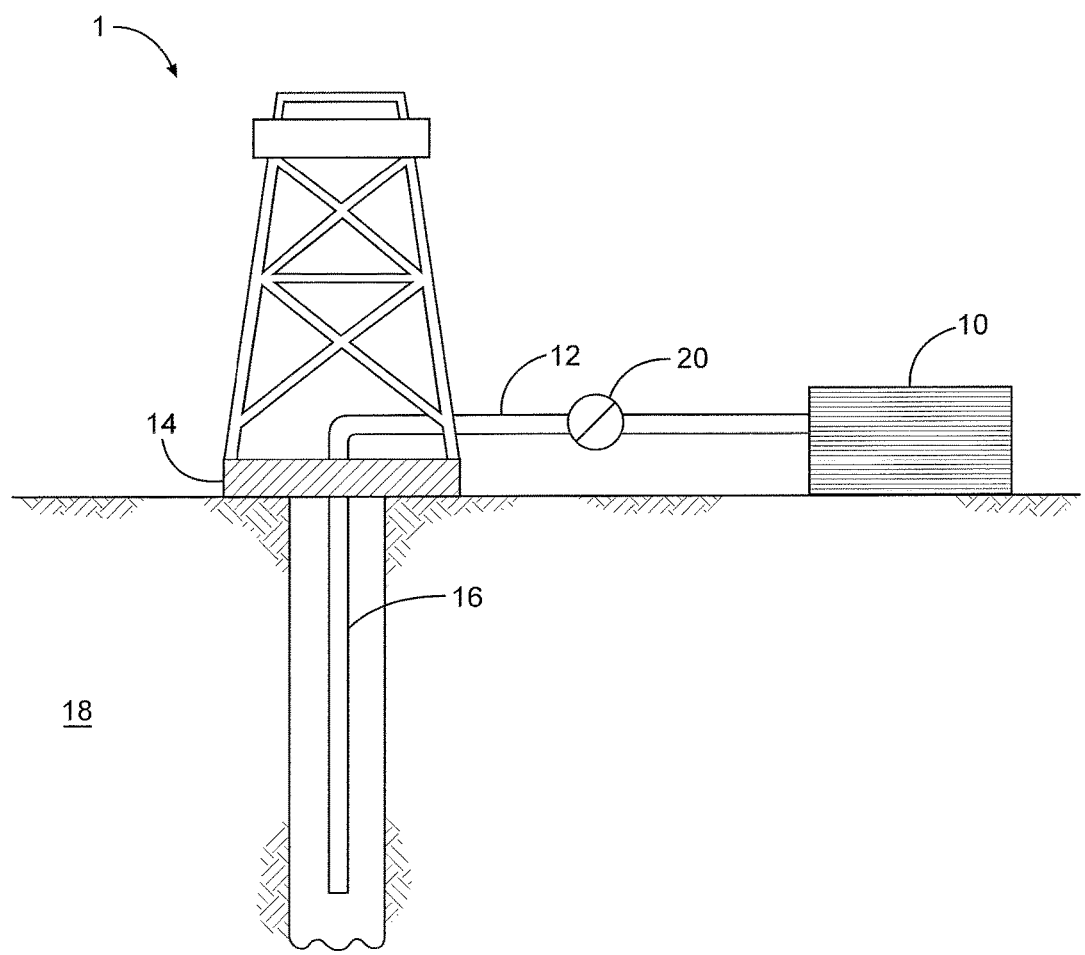
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of the viscosifier polymer and polyamine viscosity modifier therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

For example, the composition can include a viscosifier polymer including an ethylene repeating unit including an —NR$^a$—C(O)—R$^b$ group, wherein at each occurrence R$^a$ and R$^b$ are each independently selected from —H and substituted or unsubstituted (C$_1$-C$_{20}$)hydrocarbyl or R$^a$ and R$^b$ together form a substituted or unsubstituted (C$_2$-C$_{20}$) hydrocarbylene. The viscosifier polymer can include an ethylene repeating unit including an —S(O)$_2$OR$^1$ group wherein at each occurrence R$^1$ is independently selected from —H, substituted or unsubstituted (C$_1$-C$_{20}$)hydrocarbyl, and a counterion. The viscosifier polymer can include at least one crosslinker repeating unit comprising an ethylene repeating unit which at each occurrence is independently linked to an ethylene repeating unit in the same viscosifier polymer molecule or in another molecule of the viscosifier polymer via a substituted or unsubstituted (C$_1$-C$_{40}$)hydrocarbylene that is interrupted by 0, 1, 2, or 3 groups independently chosen from —O—, —S—, and substituted or unsubstituted —NH—. The repeating units of the viscosifier polymer are in block, alternate, or random configuration. The composition can also include a polyamine viscosity modifier.

The composition can further include any suitable component, such as components typically used in drilling fluid compositions. In some embodiments, the composition includes clay. The composition can be substantially clay-free, e.g., the composition can have less than about 5 wt %, 4, 3, 2, 1.5, 1, 0.5, 0.4, 0.3, 0.2, 0.1, 0.05, or less than about 0.01 wt % clay. The composition can include a suitable downhole fluid. In some embodiments, the composition can be a composition for fracturing a subterranean formation, and the composition can further include suitable components typically used in fracturing fluid compositions.

In various embodiments, the composition can include a viscosifier polymer including repeating units having the structure:

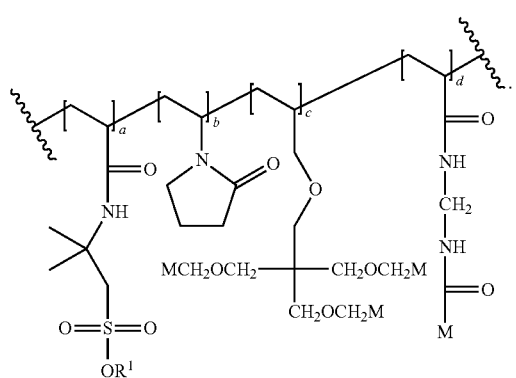

The repeating units can be in a block, alternate, or random configuration, and each repeating unit is independently in the orientation shown or in the opposite orientation. At each occurrence R$^1$ can be independently selected from —H, substituted or unsubstituted (C$_1$-C$_{20}$)hydrocarbyl, and a counterion. At each occurrence M can be independently an ethylene repeating unit of the same viscosifier polymer molecule or an ethylene repeating unit of another molecule of the viscosifier polymer. The viscosifier polymer can have about 50 mol % to about 98 mol % of the repeating unit including the —S(O)$_2$OR$^1$, about 1 mol % to about 40 mol % of the repeating unit including the 2-pyrrolidon-1-yl group, about 0.1 mol % to about 15 mol % of the repeating unit including the bisacrylamide linker, and about 0.1 mol % to about 15 mol % of the repeating unit including the —CH$_2$—O—CH$_2$—C(—C$_2$—OCH$_2$M)$_3$ group. The composition can further include at least one of poly(diallyldimethylammonium chloride) and polyacrylamide.

Method for Preparing a Composition for Treatment of a Subterranean Formation.

In various embodiments, the present invention provides a method for preparing a composition for treatment of a subterranean formation. The method can be any suitable method that produces an embodiment of the composition including the viscosifier polymer and polyamine viscosity modifier described herein.

EXAMPLES

Various embodiments of the present invention can be better understood by reference to the following Examples which are offered by way of illustration. The present invention is not limited to the Examples given herein. The abbreviation "bbl" stands for barrel (42 gallons, 159 L); the Examples were performed on a scale such that 350 mL corresponded to 1 bbl. "PV" stands for plastic viscosity. "YP" stands for yield point. Viscosity data shown in Tables 1-4 was collected using a FANN® 35 at 120° F.

Polymer A used in the Examples is a polymer prepared by copolymerization of 2-acrylamido-2-methylpropane sulfonic acid (AMPS) (83.5 mol %) and N-vinylpyrrolidone (NVP) (13.5 mol %) with two crosslinkers at the same time: methylenebisacrylamide (MBA) and pentaerythritol allyl ether (PAE, having an average of about 3.2 allyl groups per molecule), using 5.0 mol % PAE and 1.0 mol % MBA (6.0 mol % total). Unless indicated otherwise, the polydiallyldimethylammonium chloride (polyDADMAC) used in the Examples is a solid and has a molecular weight of about 1 million to 2 million. The polyacrylamide emulsion used in the Examples is a 95-100% non-ionic linear acrylamide homopolymer emulsion that is 38% active, has a molecular weight in the range of 4 million to 15 million, and is an emulsion in mineral oil.

In the Sample formulations given in the Examples, sodium bicarbonate and sodium hydroxide can act as pH buffers. Potassium chloride can act a shale stabilizer. Barite can act as a weighting agent.

To determine high pressure high temperature fluid loss, API RP 131 was followed, using glass fiber-backed 10 micron filter paper with a 500 psi differential over 30 minutes, and the volume of fluid that passed through the filter paper was multiplied by two.

Example 1

Samples 1A-1D were prepared, having the compositions indicated in Table 1.

TABLE 1

| Samples 1A-1D. | | | | |
|---|---|---|---|---|
| Sample: | 1A | 1B | 1C | 1D |
| Tap water, bbl | 0.79 | 0.79 | 0.79 | 0.79 |
| Polymer A, lb/bbl | 7.0 | 7.0 | 7.0 | 7.0 |
| Barite, lb/bbl | 311.0 | 311.0 | 311.0 | 311.0 |

TABLE 1-continued

Samples 1A-1D.

| Sample: | 1A | | 1B | | 1C | | 1D | |
|---|---|---|---|---|---|---|---|---|
| Potassium chloride, lb/bbl | 8.0 | | 8.0 | | 8.0 | | 8.0 | |
| Sodium bicarbonate, lb/bbl | 4.0 | | 4.0 | | 4.0 | | 4.0 | |
| Sodium hydroxide, lb/bbl | 0.5 | | 0.5 | | 0.5 | | 0.5 | |
| Aqueous sodium polyacrylate solution, lb/bbl | 3.0 | | 3.0 | | 3.0 | | 3.0 | |
| PolyDADMAC, lb/bbl | 0 | | 0.5 | | 1 | | 1.5 | |
| Dynamic aging @ °F./h | 150° F./16 | — | 150° F./16 | — | 150° F./16 | — | 150° F./16 | — |
| Static aging @ °F./h | — | 400° F./16 | — | 400° F./16 | — | 400° F./16 | — | 400° F./16 |
| 600 rpm, lb/100 ft² | 188 | 236 | 131 | 166 | 95 | 98 | 61 | 68 |
| 300 rpm, lb/100 ft² | 137 | 177 | 87 | 115 | 60 | 63 | 36 | 44 |
| 200 rpm, lb/100 ft² | 113 | 144 | 72 | 94 | 47 | 49 | 29 | 35 |
| 100 rpm, lb/100 ft² | 84 | 106 | 50 | 67 | 31 | 33 | 18 | 21 |
| 6 rpm, lb/100 ft² | 39 | 43 | 17 | 23 | 10 | 10 | 5 | 4 |
| 3 rpm, lb/100 ft² | 37 | 39 | 15 | 20 | 8 | 8 | 4 | 3 |
| 10 s gel, lb/100 ft² | 38 | 40 | 16 | 21 | 10 | 8 | 5 | 4 |
| 10 m gel, lb/100 ft² | 43 | 50 | 23 | 28 | 18 | 11 | 7 | 5 |
| PV, cP | 51 | 59 | 44 | 51 | 35 | 35 | 25 | 24 |
| YP, lb/100 ft² | 86 | 118 | 43 | 64 | 25 | 28 | 11 | 20 |

Figure 3:
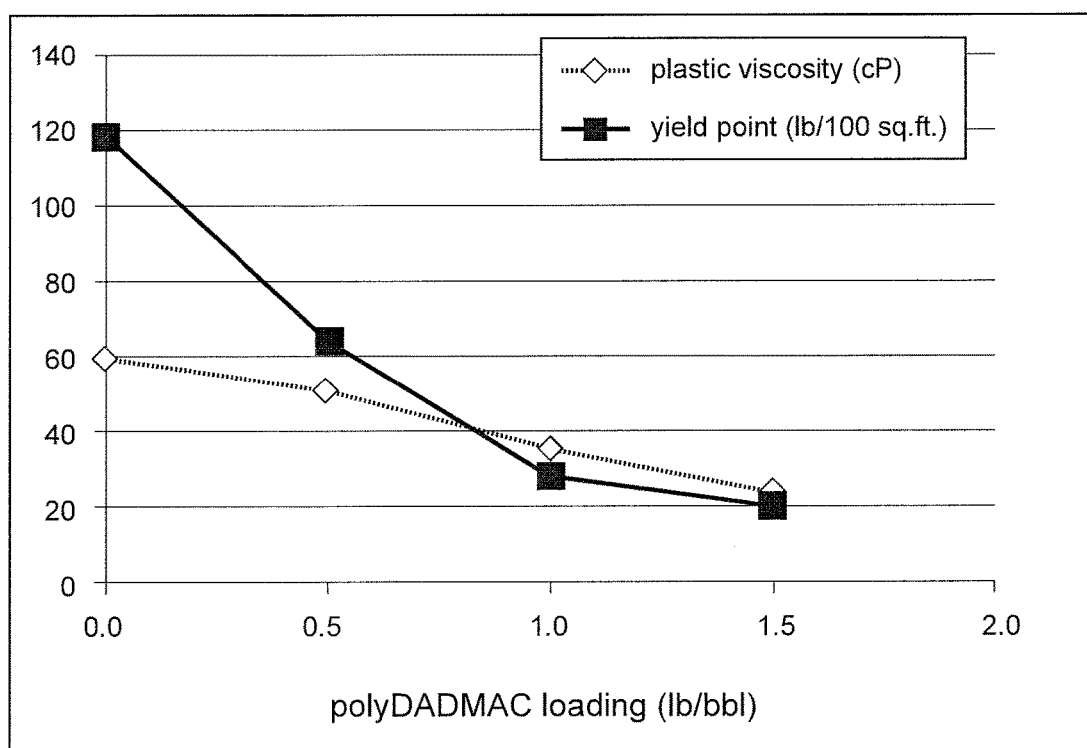
FIG. 3 illustrates plastic viscosity and yield point for compositions having various concentrations of polydiallyldimethylammonium chloride, in accordance with various embodiments.

As shown in Table 1, as the amount of the poly(DADMAC) increased, the viscosity of the Sample decreased. By adjusting the amount of poly(DADMAC), the viscosity of the Sample was controlled. FIG. 3 illustrates plastic viscosity and yield point for Samples 1A-1D.

Example 2

Samples 2A-2C were prepared, having the compositions indicated in Table 2.

TABLE 2

Samples 2A-2C.

| 14.0 lb/gal Formulation | 2A | | | 2B | | | 2C | | |
|---|---|---|---|---|---|---|---|---|---|
| Tap water, bbl | 0.79 | | | 0.79 | | | 0.79 | | |
| Polymer A, lb/bbl | 4.0 | | | 7.0 | | | 7.0 | | |
| Barite, lb/bbl | 311.0 | | | 311.0 | | | 311.0 | | |
| Potassium chloride, lb/bbl | 4.0 | | | 8.0 | | | 8.0 | | |
| Sodium bicarbonate, lb/bbl | 4.0 | | | 4.0 | | | 4.0 | | |
| Sodium hydroxide, lb/bbl | 0.5 | | | 0.5 | | | 0.5 | | |
| PolyDADMAC, lb/bbl | 0.0 | | | 0.0 | | | 1.0 | | |
| Aqueous sodium polyacrylate solution, lb/bbl | 3.0 | | | 3.0 | | | 3.0 | | |
| Dynamic aging conditions, 16 h @ °F. | — | 150 | — | — | 150 | — | — | 150 | — |
| Static aging conditions, 16 h @ °F. | — | — | 400 | — | — | 400 | — | — | 400 |
| 600 rpm, lb/100 ft² | 60 | 62 | 88 | 190 | 188 | 236 | 108 | 95 | 98 |
| 300 rpm, lb/100 ft² | 39 | 40 | 58 | 140 | 137 | 177 | 71 | 60 | 63 |
| 200 rpm, lb/100 ft² | 33 | 35 | 49 | 110 | 113 | 144 | 57 | 47 | 49 |
| 100 rpm, lb/100 ft² | 23 | 25 | 34 | 85 | 84 | 106 | 39 | 31 | 33 |
| 6 rpm, lb/100 ft² | 10 | 11 | 11 | 40 | 39 | 43 | 14 | 10 | 10 |
| 3 rpm, lb/100 ft² | 9 | 10 | 10 | 37 | 37 | 39 | 13 | 8 | 8 |
| Plastic viscosity, cP | 21 | 22 | 30 | 50 | 51 | 59 | 37 | 35 | 35 |
| Yield point, lb/100 ft² | 18 | 18 | 28 | 90 | 86 | 118 | 34 | 25 | 28 |
| HTHP filtrate @ 350° F., mL | — | 26.8 | 26.0 | — | — | 14.0 | — | — | 15.0 |

A 4.0 lb/bbl loading of polymer A provided a plastic viscosity of 30 cP and a yield point of 28 lb/100 ft² with a high pressure high temperature (HPHT) fluid loss at 350° F. of 26.0 mL after the fluid formulation was aged at 400° F. for 16 h (Table 1, Sample 2A). Increasing the loading of polymer A to 7 lb/bbl significantly increased the viscosity of the fluid and reduced the HPHT fluid loss at 350° F. to 14.0 mL (Table 1, Sample 2B). However, the high viscosity of Sample 2B required the addition of a rheology modifier to turn the fluid formulation into a practical drilling fluid formulation. Addition of 1.0 lb/bbl polyDADMAC gave a fluid with a plastic viscosity of 35 cP and a yield point of 28 lb/100 ft² with an HPHT fluid loss at 350° F. of 15.0 mL after the fluid formulation was aged at 400° F. for 16 h (Table 1, Sample 2C). Therefore, polyDADMAC provided the desired rheology modification while maintaining the viscosity before and after aging and also permitted an increased loading of polymer A, which decreased the HPHT fluid loss.

The use of polymer A and polyDADMAC provided fluid formulations with good viscosity from 10 to 17 lb/gal with <20.0 mL of HPHT fluid loss at 350° F.

Example 3

Samples 3A-3C were prepared, having the composition indicated in Table 3. In this Example the polyDADMAC used was a 20 wt % 200,000-350,000 molecular weight poly(DADMAC) solution in water.

TABLE 3

Sample 3A.

| 14.0 lb/gal Formulation | 3A | 3B | 3C |
|---|---|---|---|
| Tap water, bbl | 0.79 | 0.79 | 0.79 |
| Polymer A, lb/bbl | 7.0 | 7.0 | 7.0 |
| Barite, lb/bbl | 311.0 | 311.0 | 311.0 |
| Potassium chloride, lb/bbl | 8.0 | 8.0 | 8.0 |
| Sodium bicarbonate, lb/bbl | 4.0 | 4.0 | 4.0 |
| Sodium hydroxide, lb/bbl | 0.5 | 0.5 | 0.5 |
| PolyDADMAC solution, lb/bbl | 4.0 | — | — |
| Polyacrylamide emulsion | — | 0.5 | — |
| Cationic polyamine | — | — | 1.5 |
| Aqueous sodium polyacrylate solution, lb/bbl | 3.0 | 3.0 | 3.0 |
| Dynamic aging conditions, 16 h @ ° F. | 150 | — | — |
| Static aging conditions, 16 h @ ° F. | — | 400 | 400 |
| Plastic viscosity, cP | 30 / 33 | 37 / 50 | 38 / 45 |
| Yield point, lb/100 ft$^2$ | 21 / 20 | 39 / 65 | 39 / 78 |

Example 4

Samples 4A-4C were prepared, having the composition indicated in Table 4.

TABLE 4

Samples 4A-4C.

| 14.0 lb/gal Formulation | 4A | 4B | 4C | 4C |
|---|---|---|---|---|
| Tap water, bbl | 0.79 | — | 0.79 | 0.79 |
| Sea water, bbl | — | 0.79 | — | — |
| Polymer A, lb/bbl | 7.0 | 7.0 | 7.0 | 7.0 |
| Barite, lb/bbl | 311.0 | 311.0 | 311.0 | 311.0 |
| Potassium chloride, lb/bbl | — | — | 8.0 | 8.0 |
| Potassium acetate, lb/bbl | 6.0 | — | — | — |
| Sodium bicarbonate, lb/bbl | 4.0 | 4.0 | 4.0 | 4.0 |
| Sodium hydroxide, lb/bbl | 0.5 | 0.5 | 0.5 | 0.5 |
| polyDADMAC, lb/bbl | 1.0 | 1.0 | 1.0 | 1.0 |
| Aqueous sodium polyacrylate solution, lb/bbl | 1.5 | 3.0 | 3.0 | 3.0 |
| Amine salt blend, lb/bbl | — | — | 6.0 | 6.0 |
| Ethoxylated benzyl alcohol, lb/bbl | — | — | 4.0 | 4.0 |
| REV DUST ™ lb/bbl | — | — | — | 35.0 |
| Dynamic aging conditions, 16 h @ ° F. | — | — | — | 150 / 150$^c$ |
| Static aging conditions, 16 h @ ° F. | 400 | 400 | — | — |
| 600 rpm, lb/100 ft$^2$ | 123 / 105 | 96 / 82 | 87 | 118 |
| 300 rpm, lb/100 ft$^2$ | 79 / 69 | 60 / 48 | 56 | 75 |
| 200 rpm, lb/100 ft$^2$ | 63 / 54 | 49 / 37 | 42 | 58 |
| 100 rpm, lb/100 ft$^2$ | 43 / 37 | 32 / 24 | 27 | 38 |
| 6 rpm, lb/100 ft$^2$ | 15 / 8 | 9 / 6 | 7 | 10 |
| 3 rpm, lb/100 ft$^2$ | 13 / 6 | 8 / 5 | 5 | 8 |
| Plastic viscosity, cP | 44 / 36 | 36 / 34 | 31 | 43 |
| Yield point, lb/100 ft$^2$ | 35 / 33 | 24 / 14 | 25 | 32 |

Sample 4B statically aged at 400° F. was aged for 36 h and gave 20.8 mL HPHT fluid loss at 350° F. For Sample 4C with REV DUST™ (simulated drill solids), HPHT fluid loss at 350° F. was 17.0 mL. Addition of 35.0 lb/bbl REV DUST™ to Sample 2C in Table 2 gave the following rheology after dynamically aging the sample at 150° F. for 16 h: 600 rpm, off scale; 300 rpm, 298 cP; 200 rpm, 259 cP; 100 rpm, 206 cP; 6 rpm, 91 cP; 3 rpm, 71 cP.

Environmental concerns due to the use of chloride containing salts in the system are alleviated by substituting the potassium chloride with potassium acetate (Table 3, Sample 4A). Furthermore, the potassium-based salts were removed altogether by formulating the sample with sea water instead of fresh water (Table 4, Sample 4B). A mixture of an amine salt blend and ethoxylated benzyl alcohol provided improved compatibility and stability of the system with simulated drill solids (REV DUST™) (Table 4, Sample 4C).

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation a composition comprising a viscosifier polymer comprising an ethylene repeating unit comprising an —NR$^a$—C(O)—R$^b$ group, wherein at each occurrence R$^a$ and R$^b$ are each independently selected from —H and substituted or unsubstituted (C$_1$-C$_{20}$)hydrocarbyl or R$^a$ and R$^b$ together form a substituted or unsubstituted (C$_2$-C$_{20}$)hydrocarbylene, an ethylene repeating unit comprising an —S(O)$_2$OR$^1$ group wherein at each occurrence R$^1$ is independently selected from —H, substituted or unsubstituted (C$_1$-C$_{20}$)hydrocarbyl, and a counterion, and at least one crosslinker repeating unit comprising an ethylene repeating unit at each occurrence independently linked to an ethylene repeating unit in the same viscosifier polymer molecule or in another molecule of the viscosifier polymer via a substituted or unsubstituted (C$_1$-C$_{40}$)hydrocarbylene interrupted by 0, 1, 2, or 3 groups independently chosen from —O—, —S—, and substituted or unsubstituted —NH—, wherein the repeating units are in block, alternate, or random configuration; and a polyamine viscosity modifier.

Embodiment 2 provides the method of Embodiment 1, wherein the method further comprises obtaining or providing the composition, wherein the obtaining or providing of the composition occurs above-surface.

Embodiment 3 provides the method of any one of Embodiments 1-2, wherein the method further comprises obtaining or providing the composition, wherein the obtaining or providing of the composition occurs in the subterranean formation.

Embodiment 4 provides the method of any one of Embodiments 1-3, wherein the method comprises drilling in the subterranean formation.

Embodiment 5 provides the method of any one of Embodiments 1-4, wherein the composition is a drilling mud.

Embodiment 6 provides the method of any one of Embodiments 1-5, wherein the composition is substantially clay-free.

Embodiment 7 provides the method of any one of Embodiments 1-6, wherein the composition comprises at least one of an aqueous liquid and a water-miscible liquid.

Embodiment 8 provides the method of Embodiment 7, wherein the aqueous liquid comprises at least one of water, brine, produced water, flowback water, brackish water, and sea water.

Embodiment 9 provides the method of any one of Embodiments 7-8, wherein the aqueous liquid comprises salt water having a total dissolved solids level of about 1,000 mg/L to about 250,000 mg/L.

Embodiment 10 provides the method of any one of Embodiments 1-9, wherein at 49° C. at standard pressure at a shear rate of 3 rpm to 6 rpm the composition has a shear stress of about 3 lb/100 ft$^2$ to about 25 lb/100 ft$^2$.

Embodiment 11 provides the method of any one of Embodiments 1-10, wherein at 49° C. at standard pressure at a shear rate of 3 rpm to 6 rpm the composition has a shear stress of about 5 lb/100 ft$^2$ to about 15 lb/100 ft$^2$.

Embodiment 12 provides the method of any one of Embodiments 1-11, wherein at 49° C. at standard pressure at a shear rate of 200 rpm to 600 rpm the composition has a shear stress of about 20 lb/100 ft$^2$ to about 350 lb/100 ft$^2$.

Embodiment 13 provides the method of any one of Embodiments 1-12, wherein at 49° C. at standard pressure at a shear rate of 200 rpm to 600 rpm the composition has a shear stress of about 40 lb/100 ft$^2$ to about 130 lb/100 ft$^2$.

Embodiment 14 provides the method of any one of Embodiments 1-13, wherein at 49° C. at standard pressure the composition has a plastic viscosity of about 20 cP to about 60 cP.

Embodiment 15 provides the method of any one of Embodiments 1-14, wherein at 49° C. at standard pressure the composition has a plastic viscosity of about 25 cP to about 45 cP.

Embodiment 16 provides the method of any one of Embodiments 1-15, wherein at 49° C. at standard pressure the composition has a yield point of about 10 lb/100 ft$^2$ to about 100 lb/100 ft$^2$.

Embodiment 17 provides the method of any one of Embodiments 1-16, wherein at 49° C. at standard pressure the composition has a yield point of 20 lb/100 ft$^2$ to about 40 lb/100 ft$^2$.

Embodiment 18 provides the method of any one of Embodiments 1-17, wherein at 350° F. using a 10 micron filter with 500 psi differential for 30 minutes the composition has a fluid loss of less than about 30 mL.

Embodiment 19 provides the method of any one of Embodiments 1-18, wherein at 350° F. using a 10 micron filter with 500 psi differential for 30 minutes the composition has a fluid loss of about 10 mL to about 20 mL.

Embodiment 20 provides the method of any one of Embodiments 1-19, wherein the viscosifier polymer and the polyamine viscosity modifier form a polyelectrolyte complex.

Embodiment 21 provides the method of any one of Embodiments 1-20, wherein about 0.01 wt % to about 99.99 wt % of the composition is the viscosifier polymer.

Embodiment 22 provides the method of any one of Embodiments 1-21, wherein about 0.1 wt % to about 5 wt % of the composition is the viscosifier polymer.

Embodiment 23 provides the method of any one of Embodiments 1-22, wherein the viscosifier polymer has about $A^{mol}$ mol % of the repeating unit comprising the —S(O)$_2$OR$^1$, about $B^{mol}$ mol % of the repeating unit comprising the —NR$^a$—C(O)—R$^b$ group, about $E^{mol}$ mol % of the crosslinker repeating unit.

Embodiment 24 provides the method of Embodiment 23, wherein $E^{mol}$ is about 0.1 mol % to about 30 mol %.

Embodiment 25 provides the method of any one of Embodiments 23-24, wherein $E^{mol}$ is about 1 mol % to about 15 mol %.

Embodiment 26 provides the method of any one of Embodiments 1-25, wherein the viscosifier polymer comprises a crosslinker repeating unit that is an ethylene repeating unit at each occurrence independently linked to an ethylene repeating unit in the same viscosifier polymer molecule or in another molecule of the viscosifier polymer via a —C(O)—NH-(substituted or unsubstituted (C$_1$-C$_{20}$)hydrocarbylene)-NH—C(O)-group, and a crosslinker repeating unit that is an ethylene repeating unit bonded to an —R$^2$—O—R$^2$—C(—R$^2$—OR$^3$)$_3$ group, wherein at each occurrence R$^2$ is independently substituted or unsubstituted (C$_1$-C$_{10}$)hydrocarbylene and at each occurrence R$^3$ is independently selected from —H and -(substituted or unsubstituted (C$_1$-C$_{10}$)hydrocarbylene)-M wherein at each occurrence M is independently an ethylene repeating unit of the same viscosifier polymer molecule or an ethylene repeating unit of another molecule of the viscosifier polymer.

Embodiment 27 provides the method of Embodiment 26, wherein the viscosifier polymer has about $A^{mol}$ mol % of the repeating unit comprising the —S(O)$_2$OR$^1$, about $B^{mol}$ mol % of the repeating unit comprising the —NR$^a$—C(O)—R$^b$ group, about $Cm^{mol}$ mol % of the repeating unit comprising the —C(O)—NH-(substituted or unsubstituted (C$_1$-C$_{20}$)hydrocarbylene)-NH—C(O)-group, and about $D^{mol}$ mol % of the repeating unit comprising the —R$^2$—O—R$^2$—C(—R$^2$—OR$^3$)$_3$ group.

Embodiment 28 provides the method of any one of Embodiments 23-27, wherein $A^{mol}$ is about 50 mol % to about 98 mol %.

Embodiment 29 provides the method of any one of Embodiments 23-28, wherein $A^{mol}$ is about 75 mol % to about 95 mol %.

Embodiment 30 provides the method of any one of Embodiments 23-29, wherein $B^{mol}$ is about 1 mol % to about 40 mol %.

Embodiment 31 provides the method of any one of Embodiments 23-30, wherein $B^{mol}$ is about 5 mol % to about 20 mol %.

Embodiment 32 provides the method of any one of Embodiments 27-31, wherein $C^{mol}$ is about 0.1 mol % to about 15 mol %.

Embodiment 33 provides the method of any one of Embodiments 27-32, wherein $C^{mol}$ is about 0.5 mol % to about 8 mol %.

Embodiment 34 provides the method of any one of Embodiments 27-33, wherein $D^{mol}$ is about 0.1 mol % to about 15 mol %.

Embodiment 35 provides the method of any one of Embodiments 27-34, wherein $D^{mol}$ is about 0.5 mol % to about 8 mol %.

Embodiment 36 provides the method of any one of Embodiments 27-35, wherein $A^{mol}+B^{mol}+C^{mol}+D^{mol}$=about 100%.

Embodiment 37 provides the method of any one of Embodiments 26-36, wherein the viscosifier polymer comprises repeating units having the structure:

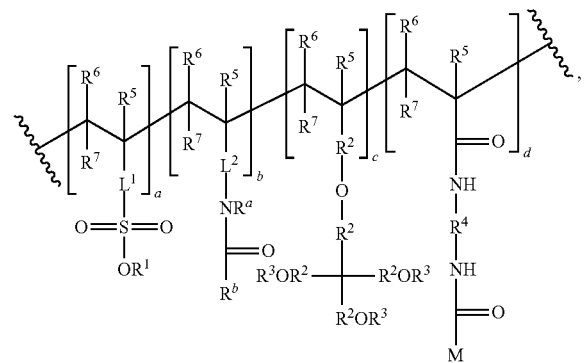

wherein the repeating units are in a block, alternate, or random configuration, and each repeating unit is independently in the orientation shown or in the opposite orientation, at each occurrence $R^5$, $R^6$, and $R^7$ are independently selected from —H and a substituted or unsubstituted ($C_1$-$C_5$)hydrocarbyl, at each occurrence, $R^4$ is independently ($C_1$-$C_{20}$)hydrocarbylene, and at each occurrence $L^1$ and $L^2$ are independently selected from a bond and a substituted or unsubstituted ($C_1$-$C_{40}$) hydrocarbyl interrupted or terminated with 0, 1, 2, or 3 of at least one of —$NR^3$—, —S—, and —O—.

Embodiment 38 provides the method of Embodiment 37, wherein at each occurrence $R^5$, $R^6$, and $R^7$ are independently selected from —H and a ($C_1$-$C_5$)alkyl.

Embodiment 39 provides the method of any one of Embodiments 37-38, wherein at each occurrence $R^5$, $R^6$, and $R^7$ are independently selected from —H and a ($C_1$-$C_3$)alkyl.

Embodiment 40 provides the method of any one of Embodiments 37-39, wherein at each occurrence $R^5$, $R^6$, and $R^7$ are each —H.

Embodiment 41 provides the method of any one of Embodiments 1-40, wherein at each occurrence $R^1$ is independently selected from —H, $Na^+$, $K^+$, $Li^+$, $NH_4^+$, $Ca^{2+}$, $Zn^{2+}$, $Al^{3+}$, $Mg^{2+}$, and $NR^E_4{}^+$, wherein at each occurrence $R^E$ is independently chosen from —H and substituted or unsubstituted ($C_1$-$C_{30}$)hydrocarbyl interrupted by 0, 1, 2, or 3 groups independently chosen from —O—, —S—, and substituted or unsubstituted —NH—, or wherein two or three $R^E$ groups together form a substituted or unsubstituted ($C_1$-$C_{30}$)hydrocarbylene or ($C_1$-$C_{30}$)hydrocarbtriyl interrupted by 0, 1, 2, or 3 groups independently chosen from —O—, —S—, and substituted or unsubstituted —NH—.

Embodiment 42 provides the method of any one of Embodiments 1-41, wherein at each occurrence $R^1$ is H.

Embodiment 43 provides the method of any one of Embodiments 1-42, wherein at each occurrence $R^1$ is ($C_1$-$C_5$)alkyl.

Embodiment 44 provides the method of any one of Embodiments 37-43, wherein at each occurrence $L^1$ is independently selected from a bond and -(substituted or unsubstituted ($C_1$-$C_{20}$)hydrocarbyl)-$NR^3$-(substituted or unsubstituted ($C_1$-$C_{20}$)hydrocarbyl)-.

Embodiment 45 provides the method of any one of Embodiments 37-44, wherein at each occurrence $L^1$ is independently —C(O)—NH—(($C_1$-$C_5$)hydrocarbyl)-.

Embodiment 46 provides the method of any one of Embodiments 37-45, wherein $L^1$ is —C(O)—NH—CH($CH_3$)$_2$—$CH_2$—.

Embodiment 47 provides the method of any one of Embodiments 37-46, wherein at each occurrence $L^2$ is independently selected from a bond and substituted or unsubstituted ($C_1$-$C_{20}$)hydrocarbylene.

Embodiment 48 provides the method of any one of Embodiments 37-47, wherein at each occurrence $L^2$ is independently selected from a bond and ($C_1$-$C_{20}$)alkylene.

Embodiment 49 provides the method of any one of Embodiments 37-48, wherein at each occurrence $L^2$ is independently selected from a bond and ($C_1$-$C_5$)alkylene.

Embodiment 50 provides the method of any one of Embodiments 37-49, wherein at each occurrence $L^2$ is a bond.

Embodiment 51 provides the method of any one of Embodiments 37-50, wherein at each occurrence $R^a$ and $R^b$ are independently selected from —H and ($C_1$-$C_{20}$)alkyl.

Embodiment 52 provides the method of any one of Embodiments 37-51, wherein at each occurrence $R^a$ and $R^b$ are independently selected from —H and ($C_1$-$C_{10}$)alkyl Embodiment 53 provides the method of any one of Embodiments 37-52, wherein at each occurrence $R^a$ and $R^b$ are independently selected from —H, methyl, ethyl, propyl, butyl, and pentyl.

Embodiment 54 provides the method of any one of Embodiments 37-53, wherein $R^a$ and $R^b$ together form a ($C_2$-$C_8$)alkylene group.

Embodiment 55 provides the method of any one of Embodiments 37-54, wherein at each occurrence $R^2$ is ($C_1$-$C_{10}$)alkylene.

Embodiment 56 provides the method of any one of Embodiments 37-55, wherein at each occurrence $R^2$ is ($C_1$-$C_5$)alkylene.

Embodiment 57 provides the method of any one of Embodiments 37-56, wherein at each occurrence $R^2$ is —$CH_2$—.

Embodiment 58 provides the method of any one of Embodiments 37-57, wherein at each occurrence $R^3$ is independently selected from —H and —(($C_1$-$C_{10}$)alkylene)-M.

Embodiment 59 provides the method of any one of Embodiments 37-58, wherein at each occurrence $R^3$ is independently selected from —H and —(($C_1$-$C_5$)alkylene)-M.

Embodiment 60 provides the method of any one of Embodiments 37-59, wherein at each occurrence $R^3$ is independently selected from —H and —$CH_2$-M.

Embodiment 61 provides the method of any one of Embodiments 37-60, wherein at least one $R^3$-containing repeating unit has at least one $R^3$ that is M.

Embodiment 62 provides the method of any one of Embodiments 37-61, wherein per molecule the $R^3$-containing repeating units have an average of about 1, 2, or 3 $R^3$ that are M.

Embodiment 63 provides the method of any one of Embodiments 37-62, wherein at each occurrence $R^4$ is ($C_1$-$C_{20}$)alkylene.

Embodiment 64 provides the method of any one of Embodiments 37-63, wherein at each occurrence $R^4$ is $(C_1-C_5)$alkylene.

Embodiment 65 provides the method of any one of Embodiments 37-64, wherein at each occurrence $R^4$ is methylene.

Embodiment 66 provides the method of any one of Embodiments 1-65, wherein the viscosifier polymer has a molecular weight of about 2,000,000 g/mol to about 1,000,000,000 g/mol.

Embodiment 67 provides the method of any one of Embodiments 1-66, wherein the viscosifier polymer as a molecular weight of at least about 5,000,000 g/mol.

Embodiment 68 provides the method of any one of Embodiments 37-67, wherein a is about 1,000 to about 500,000.

Embodiment 69 provides the method of any one of Embodiments 37-68, wherein b is about 100 to about 200,000.

Embodiment 70 provides the method of any one of Embodiments 37-69, wherein c is about 1 to about 50,000.

Embodiment 71 provides the method of any one of Embodiments 37-70, wherein d is about 1 to about 50,000.

Embodiment 72 provides the method of any one of Embodiments 1-71, wherein the viscosifier polymer comprises repeating units having the structure:

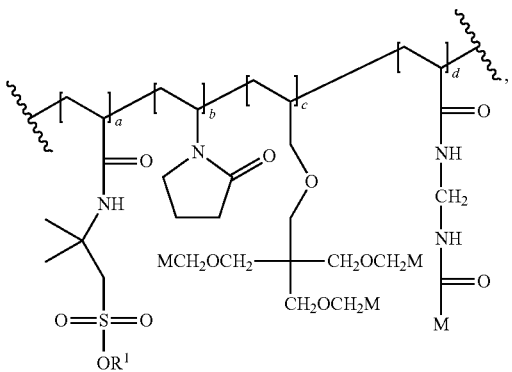

wherein the repeating units are in a block, alternate, or random configuration, and each repeating unit is independently in the orientation shown or in the opposite orientation.

Embodiment 73 provides the method of any one of Embodiments 1-72, wherein about 0.01 wt % to about 99.99 wt % of the composition is the polyamine viscosity modifier.

Embodiment 74 provides the method of any one of Embodiments 1-73, wherein about 0.01 wt % to about 5 wt % of the composition is the polyamine viscosity modifier.

Embodiment 75 provides the method of any one of Embodiments 1-74, wherein the polyamine viscosity modifier is a polymer that comprises at least one substituted or unsubstituted repeating unit having an ethylenamide structure:

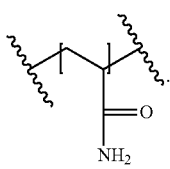

Embodiment 76 provides the method of Embodiment 75, wherein about 50% to about 100% of repeating units in the polyamine viscosity modifier have the ethylenamide structure.

Embodiment 77 provides the method of any one of Embodiments 1-76, wherein the polyamine viscosity modifier is a polyacrylamide.

Embodiment 78 provides the method of any one of Embodiments 1-77, wherein the polyamine viscosity modifier is a cationic polyamine viscosity modifier.

Embodiment 79 provides the method of Embodiment 78, wherein the cationic polyamine viscosity modifier is a polymer comprising at least one repeating unit formed from polymerization of a di$(C_2-C_{20})$alkenyldi$(C_1-C_{20})$alkyl)ammonium halide.

Embodiment 80 provides the method of any one of Embodiments 78-80, wherein the cationic polyamine viscosity modifier is a poly(di$(C_2-C_{20})$alkenyldi$(C_1-C_{20})$alkyl) ammonium halide).

Embodiment 81 provides the method of any one of Embodiments 78-80, wherein the cationic polyamine viscosity modifier is a poly(diallyldi$(C_1-C_5)$alkyl)ammonium halide).

Embodiment 82 provides the method of any one of Embodiments 1-81, wherein the polyamine viscosity modifier is poly(diallyldimethylammonium chloride).

Embodiment 83 provides the method of any one of Embodiments 1-82, wherein the composition further comprises a polyacrylate.

Embodiment 84 provides the method of any one of Embodiments 1-83, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof, to form a mixture, wherein the placing the composition in the subterranean formation comprises placing the mixture in the subterranean formation.

Embodiment 85 provides the method of any one of Embodiments 1-84, wherein at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, logging fluid, or a combination thereof.

Embodiment 86 provides the method of any one of Embodiments 1-85, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 87 provides the method of any one of Embodiments 1-86, wherein the placing of the composition in the subterranean formation comprises pumping the composition through a tubular disposed in a wellbore and into the subterranean formation.

Embodiment 88 provides the method of any one of Embodiments 1-87, wherein the placing of the composition in the subterranean formation comprises pumping the composition through a drill string disposed in a wellbore, through a drill bit at a downhole end of the drill string, and back above-surface through an annulus.

Embodiment 89 provides the method of Embodiment 88, further comprising processing the composition exiting the annulus with at least one fluid processing unit to generate a cleaned composition and recirculating the cleaned composition through the wellbore.

Embodiment 90 provides a system for performing the method of any one of Embodiments 1-89, the system comprising:
a tubular disposed in the subterranean formation; and
a pump configured to pump the composition in the subterranean formation through the tubular.

Embodiment 91 provides a system for performing the method of any one of Embodiments 1-90, the system comprising:
a drill string disposed in a wellbore, the drill string comprising a drill bit at a downhole end of the drill string;
an annulus between the drill string and the wellbore; and
a pump configured to circulate the composition through the drill string, through the drill bit, and back above-surface through the annulus.

Embodiment 92 provides a method of treating a subterranean formation, the method comprising:
placing in a subterranean formation a composition comprising
a viscosifier polymer comprising repeating units having the structure:

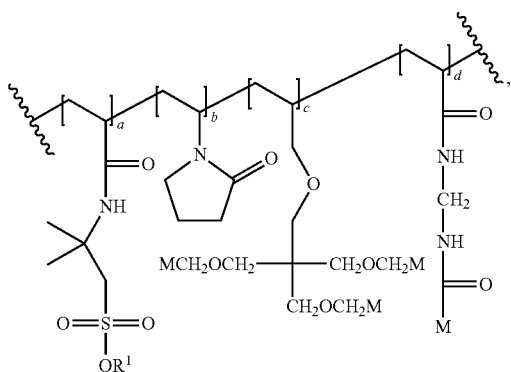

wherein
the repeating units are in a block, alternate, or random configuration, and each repeating unit is independently in the orientation shown or in the opposite orientation,
at each occurrence $R^1$ is independently selected from —H, substituted or unsubstituted $(C_1-C_{20})$hydrocarbyl, and a counterion,
at each occurrence M is independently an ethylene repeating unit of the same viscosifier polymer molecule or an ethylene repeating unit of another molecule of the viscosifier polymer, and the viscosifier polymer has about 50 mol % to about 98 mol % of the repeating unit comprising the —S(O)$_2$OR$^1$, about 1 mol % to about 40 mol % of the repeating unit comprising the 2-pyrrolidon-1-yl group, about 0.1 mol % to about 15 mol % of the repeating unit comprising the bisacrylamide linker, and about 0.1 mol % to about 15 mol % of the repeating unit comprising the —CH$_2$—O—CH$_2$—C(—CH$_2$—OCH$_2$M)$_3$ group; and
at least one of poly(diallyldimethylammonium chloride) and polyacrylamide.

Embodiment 93 provides the method of Embodiment 92, wherein the composition is a drilling mud, wherein the method comprises drilling in the subterranean formation using the composition.

Embodiment 94 provides the method of any one of Embodiments 92-93, wherein the composition is substantially clay-free.

Embodiment 95 provides a system comprising:
a composition comprising
a viscosifier polymer comprising
an ethylene repeating unit comprising an —NR$^a$—C(O)—R$^b$ group, wherein at each occurrence R$^a$ and R$^b$ are each independently selected from —H and substituted or unsubstituted $(C_1-C_{20})$hydrocarbyl or R$^a$ and R$^b$ together form a substituted or unsubstituted $(C_2-C_{20})$hydrocarbylene,
an ethylene repeating unit comprising an —S(O)$_2$OR$^1$ group wherein at each occurrence R$^1$ is independently selected from —H, substituted or unsubstituted $(C_1-C_{20})$hydrocarbyl, and a counterion,
at least one crosslinker repeating unit comprising an ethylene repeating unit at each occurrence independently linked to an ethylene repeating unit in the same viscosifier polymer molecule or in another molecule of the viscosifier polymer via a substituted or unsubstituted $(C_1-C_{40})$hydrocarbylene interrupted by 0, 1, 2, or 3 groups independently chosen from —O—, —S—, and substituted or unsubstituted —NH—,
wherein the repeating units are in block, alternate, or random configuration; and
a polyamine viscosity modifier; and
a subterranean formation comprising the composition therein.

Embodiment 96 provides the system of Embodiment 95, further comprising
a drill string disposed in a wellbore, the drill string comprising a drill bit at a downhole end of the drill string;
an annulus between the drill string and the wellbore; and
a pump configured to circulate the composition through the drill string, through the drill bit, and back above-surface through the annulus.

Embodiment 97 provides the system of Embodiment 96, further comprising a fluid processing unit configured to process the composition exiting the annulus to generate a cleaned drilling fluid for recirculation through the wellbore.

Embodiment 98 provides the system of any one of Embodiments 95-97, further comprising
a tubular disposed in the subterranean formation; and
a pump configured to pump the composition in the subterranean formation through the tubular.

Embodiment 99 provides a composition for treatment of a subterranean formation, the composition comprising:
a viscosifier polymer comprising
an ethylene repeating unit comprising an —NR$^a$—C(O)—R$^b$ group, wherein at each occurrence R$^a$ and R$^b$ are each independently selected from —H and substituted or unsubstituted $(C_1$-$C_{20})$hydrocarbyl or $R^a$ and $R^b$ together form a substituted or unsubstituted $(C_2$-$C_{20})$hydrocarbylene, an ethylene repeating unit comprising an —S(O)$_2$OR$^1$ group wherein at each occurrence R$^1$ is independently selected from —H, substituted or unsubstituted $(C_1$-$C_{20})$hydrocarbyl, and a counterion, at least one crosslinker repeating unit comprising an ethylene repeating unit at each occurrence independently linked to an ethylene repeating unit in the same viscosifier polymer molecule or in another molecule of the viscosifier polymer via a substituted or unsubstituted $(C_1$-$C_{40})$hydrocarbylene interrupted by 0, 1, 2, or 3 groups independently chosen from —O—, —S—, and substituted or unsubstituted —NH—, wherein the repeating units are in block, alternate, or random configuration; and a polyamine viscosity modifier.

Embodiment 100 provides the composition of Embodiment 99, wherein the composition further comprises a downhole fluid.

Embodiment 101 provides the composition of any one of Embodiments 99-100, wherein the composition is a drilling fluid composition for drilling a subterranean formation.

Embodiment 102 provides a composition for treatment of a subterranean formation, the composition comprising:

a viscosifier polymer comprising repeating units having the structure:

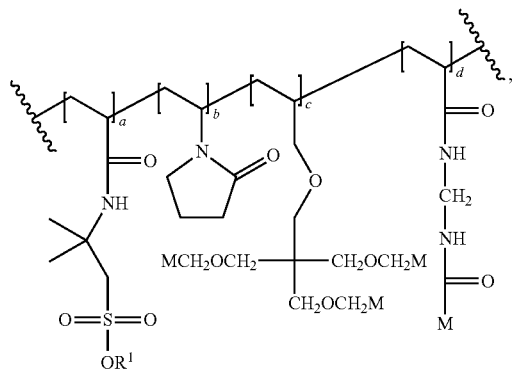

wherein
the repeating units are in a block, alternate, or random configuration, and each repeating unit is independently in the orientation shown or in the opposite orientation, at each occurrence R$^1$ is independently selected from —H, substituted or unsubstituted $(C_1$-$C_{20})$hydrocarbyl, and a counterion, at each occurrence M is independently an ethylene repeating unit of the same viscosifier polymer molecule or an ethylene repeating unit of another molecule of the viscosifier polymer, and the viscosifier polymer has about 50 mol % to about 98 mol % of the repeating unit comprising the —S(O)$_2$OR$^1$, about 1 mol % to about 40 mol % of the repeating unit comprising the 2-pyrrolidon-1-yl group, about 0.1 mol % to about 15 mol % of the repeating unit comprising the bisacrylamide linker, and about 0.1 mol % to about 15 mol % of the repeating unit comprising the —CH$_2$—O—CH$_2$—C(—CH$_2$—OCH$_2$M)$_3$ group; and at least one of poly(diallyldimethylammonium chloride) and polyacrylamide.

Embodiment 103 provides the method of Embodiment 102, wherein the composition is a drilling mud.

Embodiment 104 provides the method of any one of Embodiments 102-103, wherein the composition is substantially clay-free.

Embodiment 105 provides a method of preparing a composition for treatment of a subterranean formation, the method comprising:

forming a composition comprising
a viscosifier polymer comprising
an ethylene repeating unit comprising an —NR$^a$—C(O)—R$^b$ group, wherein at each occurrence R$^a$ and R$^b$ are each independently selected from —H and substituted or unsubstituted $(C_1$-$C_{20})$hydrocarbyl or R$^a$ and R$^b$ together form a substituted or unsubstituted $(C_2$-$C_{20})$hydrocarbylene, an ethylene repeating unit comprising an —S(O)$_2$OR$^1$ group wherein at each occurrence R$^1$ is independently selected from —H, substituted or unsubstituted $(C_1$-$C_{20})$hydrocarbyl, and a counterion, at least one crosslinker repeating unit comprising an ethylene repeating unit at each occurrence independently linked to an ethylene repeating unit in the same viscosifier polymer molecule or in another molecule of the viscosifier polymer via a substituted or unsubstituted $(C_1$-$C_{40})$hydrocarbylene interrupted by 0, 1, 2, or 3 groups independently chosen from —O—, —S—, and substituted or unsubstituted —NH—, wherein the repeating units are in block, alternate, or random configuration; and a polyamine viscosity modifier.

Embodiment 106 provides the composition, method, or system of any one or any combination of Embodiments 1-105 optionally configured such that all elements or options recited are available to use or select from.

What is claimed is:

1. A composition for treatment of a subterranean formation, the composition comprising:
   a viscosifier polymer comprising
      an ethylene repeating unit comprising an —NR$^a$—C(O)—R$^b$ group, wherein at each occurrence R$^a$ and R$^b$ are each independently selected from —H and substituted or unsubstituted $(C_1$-$C_{20})$hydrocarbyl or R$^a$ and R$^b$ together form a substituted or unsubstituted $(C_2$-$C_{20})$hydrocarbylene,
      an ethylene repeating unit comprising an —S(O)$_2$OR$^1$ group wherein at each occurrence R$^1$ is independently selected from —H, substituted or unsubstituted $(C_1$-$C_{20})$hydrocarbyl, and a counterion,
      at least one crosslinker repeating unit comprising an ethylene repeating unit at each occurrence independently linked to an ethylene repeating unit in the same viscosifier polymer molecule or in another molecule of the viscosifier polymer via a substituted or unsubstituted $(C_1$-$C_{40})$hydrocarbylene interrupted by 0, 1, 2, or 3 groups independently chosen from —O—, —S—, and substituted or unsubstituted —NH—,
      wherein the repeating units are in block, alternate, or random configuration; and
   a polyamine viscosity modifier, wherein the polyamine viscosity modifier is present in the composition in an amount of about 0.01 wt % to about 5 wt %, wherein the polyamine viscosity modifier reduces the viscosity of the composition such that the composition comprising the polyamine viscosity modifier has a lower viscosity than an equivalent composition without the polyamine viscosity modifier.

2. The composition of claim 1, wherein the composition further comprises a downhole fluid.

3. The composition of claim 1, wherein the composition is a drilling fluid composition for drilling a subterranean formation.

4. A composition for treatment of a subterranean foiniation, the composition comprising:

a viscosifier polymer comprising repeating units having the structure:

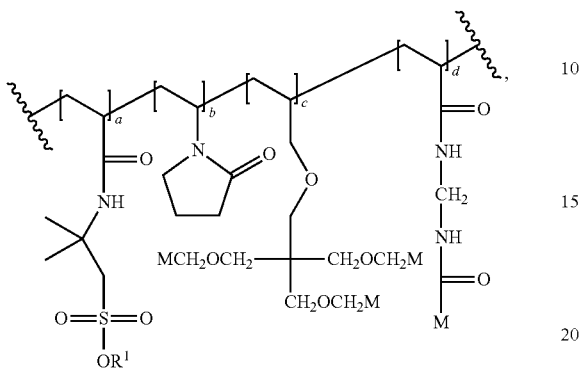

wherein the repeating units are in a block, alternate, or random configuration, and each repeating unit is independently in the orientation shown or in the opposite orientation, at each occurrence $R^1$ is independently selected from —H, substituted or unsubstituted $(C_1\text{-}C_{20})$hydrocarbyl, and a counterion, at each occurrence M is independently an ethylene repeating unit of the same viscosifier polymer molecule or an ethylene repeating unit of another molecule of the viscosifier polymer, and the viscosifier polymer has about 50 mol % to about 98 mol % of the repeating unit comprising the —S(O)$_2$OR$^1$, about 1 mol % to about 40 mol % of the repeating unit comprising the 2-pyrrolidon-1-yl group, about 0.1 mol % to about 15 mol % of the repeating unit comprising the bisacrylamide linker, and about 0.1 mol % to about 15 mol % of the repeating unit comprising the —CH$_2$—O—CH$_2$—C(—CH$_2$—OCH$_2$M)$_3$ group; and at least one of poly(diallyldimethylammonium chloride) and polyacrylamide.

5. The composition of claim 4, wherein the composition is a drilling mud.

6. The composition of claim 4, wherein the composition is substantially clay-free.

* * * * *